(12) United States Patent
Kusumura et al.

(10) Patent No.: US 11,727,203 B2
(45) Date of Patent: Aug. 15, 2023

(54) INFORMATION PROCESSING SYSTEM, FEATURE DESCRIPTION METHOD AND FEATURE DESCRIPTION PROGRAM

(71) Applicant: DOTDATA, INC, San Mateo, CA (US)

(72) Inventors: Yukitaka Kusumura, Tokyo (JP); Ryohei Fujimaki, Tokyo (JP)

(73) Assignee: DOTDATA, INC., San Mateo, CA (US)

( * ) Notice: Subject to any disclaimer, the term of this patent is extended or adjusted under 35 U.S.C. 154(b) by 790 days.

(21) Appl. No.: 16/498,014

(22) PCT Filed: Mar. 23, 2018

(86) PCT No.: PCT/JP2018/011657
§ 371 (c)(1),
(2) Date: Sep. 26, 2019

(87) PCT Pub. No.: WO2018/180970
PCT Pub. Date: Oct. 4, 2018

(65) Prior Publication Data
US 2020/0387664 A1    Dec. 10, 2020

Related U.S. Application Data

(60) Provisional application No. 62/478,882, filed on Mar. 30, 2017.

(51) Int. Cl.
*G06F 16/00* (2019.01)
*G06F 16/242* (2019.01)
(Continued)

(52) U.S. Cl.
CPC .......... *G06F 40/177* (2020.01); *G06F 16/243* (2019.01); *G06F 16/24575* (2019.01); *G06F 40/186* (2020.01); *G06N 20/00* (2019.01)

(58) Field of Classification Search
CPC ...... G06F 16/243; G06F 16/00; G06F 40/186; G06F 16/24575; G06F 40/177; G06N 20/00
See application file for complete search history.

(56) References Cited

U.S. PATENT DOCUMENTS

| | | |
|---|---|---|
| 5,873,088 A | 2/1999 | Hayashi et al. |
| 6,636,860 B2 | 10/2003 | Vishnubhotla |
| | (Continued) | |

FOREIGN PATENT DOCUMENTS

| | | |
|---|---|---|
| CN | 102714767 A | 10/2012 |
| CN | 103886021 A | 6/2014 |
| | (Continued) | |

OTHER PUBLICATIONS

International Search Report for PCT/JP2018/011657 dated, Jun. 26, 2018 (PCT/ISA/210/.

(Continued)

*Primary Examiner* — Hsiungfei Peng
(74) *Attorney, Agent, or Firm* — DLA Piper LLP (US)

(57) ABSTRACT

A descriptor generation unit 81 uses a first template prepared in advance to generate a feature descriptor, which generates a feature that may affect a prediction target from a first table including a variable of the prediction target and a second table. A feature generation unit 82 generates the feature by applying the feature descriptor to the first and second tables. A feature explanation generation unit 83 generates a feature explanation about the feature descriptor or the feature on the basis of a second template. An accepting unit 84 accepts values to be assigned to the first and second templates. The descriptor generation unit 81 generates the feature descriptor by assigning the accepted values to the first template, and the feature explanation generation unit 83 generates the feature (Continued)

explanation by assigning the values assigned to the first template to the second template.

11 Claims, 23 Drawing Sheets

(51) Int. Cl.
  *G06F 16/2457* (2019.01)
  *G06N 20/00* (2019.01)
  *G06F 40/177* (2020.01)
  *G06F 40/186* (2020.01)

(56) References Cited

U.S. PATENT DOCUMENTS

| | | | |
|---|---|---|---|
| 6,718,346 | B1 | 4/2004 | Brown et al. |
| 6,973,459 | B1 | 12/2005 | Yarmus |
| 7,225,200 | B2 | 5/2007 | Chickering et al. |
| 7,546,312 | B1 | 6/2009 | Xu et al. |
| 7,991,583 | B2 | 8/2011 | Balzer et al. |
| 8,620,934 | B2 | 12/2013 | Fong et al. |
| 8,731,881 | B2 | 5/2014 | Fujimaki et al. |
| 9,130,832 | B1 | 9/2015 | Boe et al. |
| 9,146,984 | B1 | 9/2015 | Bozkaya et al. |
| 9,934,266 | B2 | 4/2018 | Wright et al. |
| 10,452,632 | B1 | 10/2019 | Simmen et al. |
| 10,713,589 | B1 * | 7/2020 | Zarandioon ............ G06N 20/20 |
| 11,182,691 | B1 * | 11/2021 | Zhang .................... G06N 20/00 |
| 2002/0147599 | A1 | 10/2002 | Vishnubhotla |
| 2002/0198889 | A1 | 12/2002 | Vishnubhotla |
| 2004/0010505 | A1 | 1/2004 | Vishnubhotla |
| 2004/0153250 | A1 | 8/2004 | Hurst et al. |
| 2005/0102303 | A1 | 5/2005 | Russell et al. |
| 2006/0173873 | A1 | 8/2006 | Prompt et al. |
| 2006/0218132 | A1 | 9/2006 | Mukhin et al. |
| 2007/0011134 | A1 | 1/2007 | Langseth et al. |
| 2007/0136346 | A1 | 6/2007 | Morris et al. |
| 2007/0185868 | A1 | 8/2007 | Roth et al. |
| 2007/0203893 | A1 | 8/2007 | Krinsky et al. |
| 2008/0263093 | A1 | 10/2008 | Alcorn et al. |
| 2009/0162824 | A1 | 6/2009 | Heck |
| 2009/0164943 | A1 | 6/2009 | Ryan et al. |
| 2010/0082601 | A1 | 4/2010 | Ramesh et al. |
| 2010/0106747 | A1 | 4/2010 | Honzal et al. |
| 2011/0302187 | A1 | 12/2011 | Otsuka et al. |
| 2012/0054174 | A1 | 3/2012 | Gagnier et al. |
| 2012/0173226 | A1 | 7/2012 | McEvoy et al. |
| 2012/0290981 | A1 | 11/2012 | Uchida |
| 2012/0330931 | A1 | 12/2012 | Nakano et al. |
| 2013/0246996 | A1 | 9/2013 | Duggal et al. |
| 2014/0136471 | A1 | 5/2014 | Kumar |
| 2014/0188918 | A1 | 7/2014 | Shamlin et al. |
| 2014/0201194 | A1 | 7/2014 | Reddy et al. |
| 2014/0223284 | A1 | 8/2014 | Rankin, Jr. et al. |
| 2014/0279074 | A1 | 9/2014 | Chen et al. |
| 2015/0309990 | A1 | 10/2015 | Allen et al. |
| 2015/0310082 | A1 | 10/2015 | Han et al. |
| 2015/0356123 | A1 | 12/2015 | Gorelik |
| 2015/0379428 | A1 | 12/2015 | Dirac et al. |
| 2015/0379430 | A1 | 12/2015 | Dirac et al. |
| 2016/0042039 | A1 | 2/2016 | Kaufmann et al. |
| 2016/0103897 | A1 | 4/2016 | Nysewander et al. |
| 2016/0173122 | A1 | 6/2016 | Akitomi et al. |
| 2016/0232213 | A1 | 8/2016 | Morinaga et al. |
| 2016/0342606 | A1 | 11/2016 | Le Mouel et al. |
| 2017/0109629 | A1 | 4/2017 | Kusumura et al. |
| 2017/0213158 | A1 | 7/2017 | Muraoka et al. |
| 2018/0095952 | A1 | 4/2018 | Rehal |
| 2018/0121442 | A1 | 5/2018 | Asadi et al. |
| 2018/0373764 | A1 | 12/2018 | Kusumura et al. |
| 2019/0043127 | A1 | 2/2019 | Mahapatra et al. |
| 2020/0057948 | A1 * | 2/2020 | Fujimaki ................ G06N 20/00 |
| 2020/0301921 | A1 | 9/2020 | Chen et al. |
| 2020/0334246 | A1 | 10/2020 | Chen et al. |
| 2020/0387505 | A1 | 12/2020 | Kusumura et al. |
| 2021/0342341 | A1 | 11/2021 | Fujimaki et al. |
| 2021/0357372 | A1 | 11/2021 | Fujimaki et al. |

FOREIGN PATENT DOCUMENTS

| | | |
|---|---|---|
| CN | 104408149 A | 3/2015 |
| CN | 104881424 A | 9/2015 |
| CN | 105488697 A | 4/2016 |
| JP | H11219367 A | 8/1999 |
| JP | 2002007435 A | 1/2002 |
| JP | 2002109150 A | 4/2002 |
| JP | 2003527649 A | 9/2003 |
| JP | 2005302040 A | 10/2005 |
| JP | 2008102736 A | 5/2008 |
| JP | 2011242851 A | 12/2011 |
| JP | 2011257812 A | 12/2011 |
| JP | 2012-059173 A | 3/2012 |
| JP | 2013-164724 A | 8/2013 |
| JP | 2013152656 A | 8/2013 |
| JP | 2013-182498 A | 9/2013 |
| JP | 2013542478 A | 11/2013 |
| JP | 2015075970 A | 4/2015 |
| WO | WO0065484 A2 | 11/2000 |
| WO | WO2012025493 A1 | 3/2012 |
| WO | WO2012128207 A1 | 9/2012 |
| WO | WO2014208205 A | 12/2014 |
| WO | WO2015045318 A1 | 4/2015 |
| WO | WO2015085916 A1 | 6/2015 |
| WO | 2015/186278 A1 | 12/2015 |
| WO | WO2016017086 A1 | 2/2016 |
| WO | WO2017090475 A1 | 6/2017 |

OTHER PUBLICATIONS

Swati Thacker et al., "Oracle Fusion Middleware", Oracle Reports User's Guide to Building Reports 11g Release 1 (11.1.), Jul. 31, 2013 (Jul. 31, 2013), XP055659020, Retrieved from the Internet: URL: https:// docs.oracle.com/middleware/11119/classic/build-reports/B32122-03.pdf [retrieved on Jan. 17, 2020], 776 pages.

Zaman et al., "Modeling and querying multidimensional data sources in Siebel Analytics", SIGMOD 2005: Proceedings of the ACM SIGMOD International Conference on Management of Data; Baltimore, Maryland, Jun. 14-16, 2005, Association for Computing Machinery, New York, NY, Jun. 14, 2005 (Jun. 14, 2005), pp. 822-827 (6 pages).

StatSlice Systems Excel at Data Mining—Connecting to a SQL Data Source, YouTube, Jul. 18, 2014, URL: https://www.youtube.com/watch?v=7RYbDWa9or8, retrieved on Jun. 011, 2019, 1 page.

Nakamura, Shirou et al., "Practical Methods for Constructing Data Warehouse," Nikkei Computer, (non-official translation) Sep. 15, 1997 (Sep. 15, 1997), pp. 237-249.

Samorani et al., "A Randomized Exhaustive Propositionalizing Approach For Molecule Classification", Leeds School of Business, University of Colorado at Boulder, UCB 419, Boulder, Colorado 80309-0419, 27 pages.

Samorani et al., "Data Mining for Enhanced Operations Management Decision Making: Applications in Health Care", Department of Operations and Information Management, 2012, 159 pages.

Office Action for Japanese Patent Application No. 2019546532, dated Mar. 1, 2023, 10 pages.

web.archive.org: "Generate Near Table," Esri, Nov. 20, 2016, 03 Pages, [Retrieved on Oct. 11, 2022] Retrieved from URL: https://web.archive.org/web/20161113175527/http://desktop.arcgis.com/en/arcmap/10.3/tools/ analysistoolbox/generate-near-table.htm.

web.archive.org: "Spatial Join," Esri, Mar. 18, 2017, 04 Pages, [Retrieved on Oct. 11, 2022] Retrieved from URL: https://web.archive.org/web/20170318121018/http://desktop.arcgis.com/ja/arcmap/10.3/tools/analysistoolbox/spatial-join.htm.

* cited by examiner

| CUSTOMER ID (text) | TIME (time) | CALL DIRECTION (text) | TYPE (text) | CALL DURATION [s] (int) |
|---|---|---|---|---|
| 0001 | 2010/1/1 10:30:00 | IN | SMS | 0 |
| 0001 | 2010/1/1 11:15:00 | OUT | call | 65 |
| 0002 | 2010/1/1 16:00:00 | OUT | call | 56 |
| 0002 | 2010/1/5 19:30:00 | IN | SMS | 0 |
| 0002 | 2010/1/5 21:30:00 | OUT | call | 50 |
| 0003 | 2010/1/1 10:30:00 | OUT | call | 60 |
| 0004 | 2010/1/4 15:23:00 | IN | call | 40 |
| ... | ... | ... | ... | ... |

↓ CALL DIRECTION=OUT

| CUSTOMER ID (text) | TIME (time) | CALL DIRECTION (text) | TYPE (text) | CALL DURATION [s] (int) |
|---|---|---|---|---|
| 0001 | 2010/1/1 11:15:00 | OUT | call | 65 |
| 0002 | 2010/1/1 16:00:00 | OUT | call | 56 |
| 0002 | 2010/1/5 21:30:00 | OUT | call | 50 |
| 0003 | 2010/1/1 10:30:00 | OUT | call | 60 |
| ... | ... | ... | ... | ... |

FIG. 4

| CUSTOMER ID (text) | PLAN (text) | DEVICE (text) | CALL DURATION [s] (int) | CANCELLATION (int) |
|---|---|---|---|---|
| 0001 | P1 | APhone | 0 | 1 |
| 0001 | P1 | APhone | 65 | 1 |
| 0002 | P2 | APhone | 56 | 0 |
| 0002 | P2 | APhone | 0 | 0 |
| 0002 | P2 | APhone | 50 | 0 |
| 0003 | P1 | BPhone | 60 | 1 |
| 0004 | P2 | BPhone | 40 | 1 |
| ... | ... | ... | ... | ... |

~ R13

| COLUMN NAME | AGGREGATE FUNCTION |
|---|---|
| CALL DURATION | MAX |

⇩

| CUSTOMER ID (text) | PLAN (text) | DEVICE (text) | MAX CALL DURATION [s] (int) | CANCELLATION (int) |
|---|---|---|---|---|
| 0001 | P1 | APhone | 65 | 1 |
| 0002 | P2 | APhone | 56 | 0 |
| 0003 | P1 | BPhone | 60 | 1 |
| 0004 | P2 | BPhone | 40 | 1 |
| ... | ... | ... | ... | ... |

TARGET TABLE

| CUSTOMER ID (text) | PLAN (text) | DEVICE (text) | CANCELLATION (int) |
|---|---|---|---|
| 0001 | P1 | APhone | 1 |
| 0002 | P2 | APhone | 0 |
| 0003 | P1 | BPhone | 1 |
| 0004 | P2 | BPhone | 1 |
| ... | ... | ... | ... |

T11

SOURCE TABLE

| CUSTOMER ID (text) | TIME (datetime) | CALL DIRECTION (text) | TYPE (text) | CALL DURATION [s] (int) |
|---|---|---|---|---|
| 0001 | 2010-1-1 10:30:00 | IN | SMS | 0 |
| 0001 | 2010-1-1 11:15:00 | OUT | call | 65 |
| 0001 | 2010-1-1 16:00:00 | OUT | call | 56 |
| 0001 | 2010-1-5 19:30:00 | IN | SMS | 80 |
| 0001 | 2010-1-5 21:30:00 | OUT | call | 50 |
| 0002 | 2010-1-1 10:30:00 | OUT | call | 60 |
| ... | ... | ... | ... | ... |

S11 filter DEFINITION
· F LIST

| CONDITIONAL EXPRESSION |
|---|
| CALL DIRECTION=IN |
| CALL DIRECTION=OUT |
| TYPE=SMS |
| TYPE=call |
| HOUR(TIME)<7 |
| HOUR(TIME)>7 and HOUR(TIME)<12 |
| CALL DIRECTION=IN and TYPE=SMS |
| CALL DIRECTION=IN and TYPE=call |
| CALL DIRECTION=IN and HOUR(TIME)<7 |
| CALL DIRECTION=IN and HOUR(TIME)>7 and HOUR(TIME)<12 |
| ... |
| TYPE=call and CALL DIRECTION=IN and HOUR(TIME)>7 and HOUR(TIME)<12 |

18 CANDIDATES map DEFINITION
· M LIST

| T COLUMN NAME | S COLUMN NAME |
|---|---|
| CUSTOMER ID | CUSTOMER ID |

1 CANDIDATE reduce DEFINITION
· R LIST

| COLUMN NAME | AGGREGATE FUNCTION |
|---|---|
| CALL DURATION | COUNT |
| CALL DURATION | MEAN |
| CALL DURATION | MAX |
| CALL DURATION | MIN |
| CALL DURATION | VAR |
| TIME | MAX |

6 CANDIDATES

FIG. 8

COMBINATIONS

F(CALL DIRECTION = IN) - M(CUSTOMER ID, CUSTOMER ID) -
R(CALL DURATION, COUNT)

...

F(CALL DIRECTION = OUT and TYPE = call) - M(CUSTOMER ID, CUSTOMER ID) -
R(TIME, MAX)

TEMPLATE                                                                 Temp

SELECT T.$M.T COLUMN NAME, $R.AGGREGATE FUNCTION
($R.COLUMN NAME) from T
LEFT JOIN (select* from S where F.CONDITIONAL EXPRESSION) as Temp
on T.$M.T COLUMN NAME = Temp.$M.S COLUMN NAME group by
T.$M.T COLUMN NAME

D21

SELECT T.CUSTOMER ID, COUNT(CALL DURATION) from T
LEFT JOIN (select* from S where CALL DIRECTION = IN) as Temp
on T.CUSTOMER ID = Temp.CUSTOMER ID group by T.CUSTOMER ID

D22

SELECT T.CUSTOMER ID, MAX(TIME) from T LEFT JOIN
(select* from S where CALL DIRECTION = OUT and TYPE = call) as Temp
on T.CUSTOMER ID = Temp.CUSTOMER ID group by T.CUSTOMER ID

| CUSTOMER ID (text) | PLAN (text) | DEVICE (text) | CANCELLATION (int) |
|---|---|---|---|
| 0001 | P1 | APhone | 1 |
| 0002 | P2 | APhone | 0 |
| 0003 | P1 | BPhone | 1 |
| 0004 | P1 | BPhone | 1 |
| ... | ... | ... | ... |

S11

| CUSTOMER ID (text) | TIME (time) | CALL DIRECTION (text) | TYPE (text) | CALL DURATION [s] (int) |
|---|---|---|---|---|
| 0001 | 2010/1/1 10:30:00 | IN | SMS | 0 |
| 0001 | 2010/1/1 11:15:00 | OUT | call | 65 |
| 0002 | 2010/1/1 16:00:00 | OUT | call | 56 |
| 0002 | 2010/1/5 19:30:00 | IN | SMS | 0 |
| 0002 | 2010/1/5 21:30:00 | OUT | call | 50 |
| 0003 | 2010/1/1 10:30:00 | OUT | call | 60 |
| 0004 | 2010/1/4 15:23:00 | IN | call | 40 |
| ... | ... | ... | ... | ... |

D31

SELECT T.CUSTOMER ID, MAX(CALL DURATION) from T LEFT JOIN (select* from S where TYPE = call) as Temp on T.CUSTOMER ID = Temp. CUSTOMER ID group by T.CUSTOMER ID

| CUSTOMER ID (text) | GENERATED FEATURE [s] (int) |
|---|---|
| 0001 | 65 |
| 0002 | 56 |
| 0003 | 60 |
| 0004 | 40 |
| ... | ... |

···CUSTOMER'S MAXIMUM CALL DURATION

| CUSTOMER ID (text) | PLAN (text) | DEVICE (text) | CANCELLATION (int) |
|---|---|---|---|
| 0001 | P1 | APhone | 1 |
| 0002 | P2 | APhone | 0 |
| 0003 | P1 | BPhone | 1 |
| 0004 | P1 | BPhone | 1 |
| ... | ... | ... | ... |

S12

| CUSTOMER ID (text) | TIME (time) | CALL DIRECTION (text) | TYPE (text) | CALL DURATION [s] (int) |
|---|---|---|---|---|
| 0001 | 2010/1/1 11:15:00 | OUT | call | 65 |
| 0002 | 2010/1/1 16:00:00 | OUT | call | 56 |
| 0002 | 2010/1/5 21:30:00 | OUT | call | 50 |
| 0003 | 2010/1/1 10:30:00 | OUT | call | 60 |
| 0004 | 2010/1/4 15:23:00 | IN | call | 40 |
| ... | ... | ... | ... | ... |

D32

SELECT T.CUSTOMER ID, MAX(CALL DURATION) from T LEFT JOIN (select* from S where 1 = 1) as Temp on T.CUSTOMER ID = Temp.CUSTOMER ID group by T.CUSTOMER ID

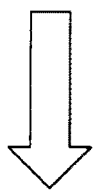

| CUSTOMER ID (text) | GENERATED FEATURE [s] (int) |
|---|---|
| 0001 | 65 |
| 0002 | 106 |
| 0003 | 60 |
| 0004 | 40 |
| ... | ... |

···CUSTOMER'S MAXIMUM CALL DURATION

R21

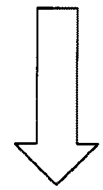

In call_log table,
MAXIMUM CALL DURATION in records HAVING THE SAME CUSTOMER ID and ALL INVOLVED

E12

FIG. 14
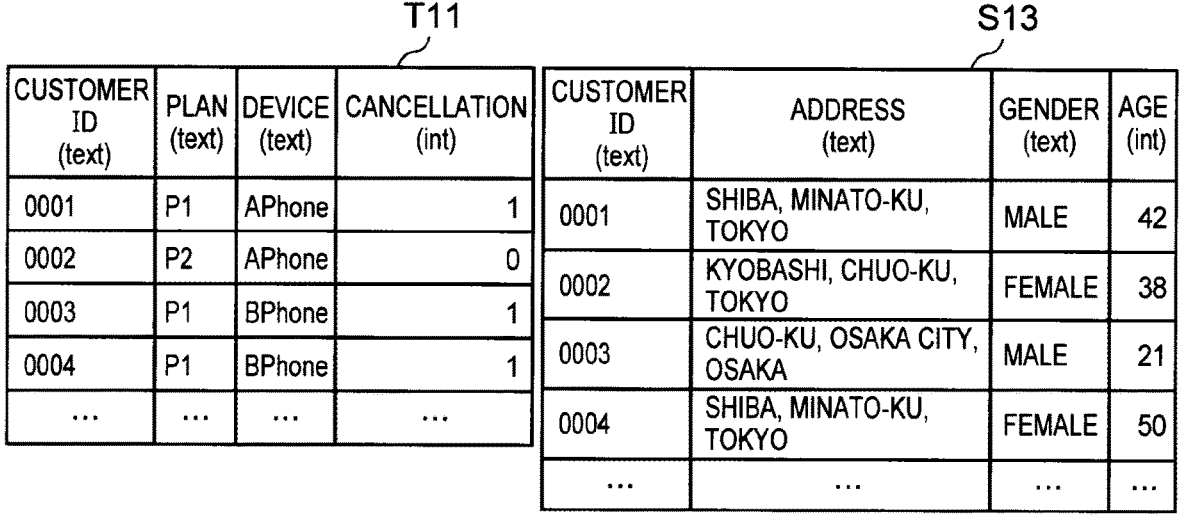
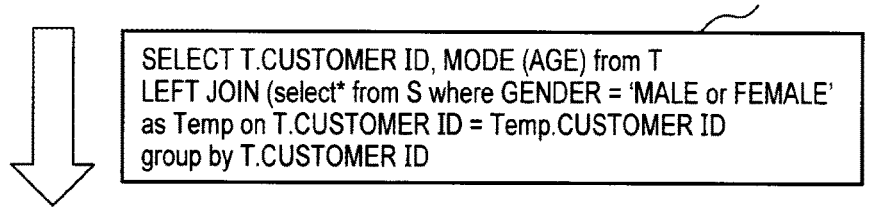
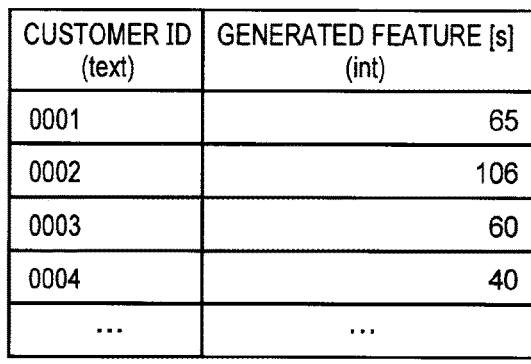 

FIG. 15 payment (PAYMENT) TABLE　　　　　　　　　　　　　　　　S14

| CUSTOMER ID (text) | TIME (time) | AMOUNT PAID (int) | METHOD OF PAYMENT (text) |
|---|---|---|---|
| 0001 | 2010/2/15 11:15:00 | ¥8,234 | PAID BY BANK TRANSFER |
| 0002 | 2010/2/15 23:20:00 | ¥12,345 | PAID AT CONVENIENCE STORE |
| 0003 | 2010/2/19 11:25:00 | ¥5,000 | PAID AT CONVENIENCE STORE |
| 0004 | 2010/2/14 10:10:00 | ¥921 | PAID BY BANK TRANSFER |
| 0004 | 2010/2/14 10:10:00 | ¥6,921 | PAID AT CONVENIENCE STORE |
| ... | ... | ... | ... | call_center (CALL CENTER) TABLE　　　　　　　　　　　　S15

| CUSTOMER ID (text) | TIME (time) | CALL DURATION [s] (int) | CONTENT OF CONSULTATION (text) |
|---|---|---|---|
| 0002 | 2010/2/14 10:00:00 | 240 | ABOUT FEES |
| 0002 | 2010/2/14 10:15:00 | 620 | ABOUT FEES |
| 0004 | 2010/2/13 9:15:00 | 420 | MODEL CHANGE |
| ... | ... | ... | ... | customer (CUSTOMER) TABLE　　　　　　　　　　　　　　S13

| CUSTOMER ID (text) | ADDRESS (text) | GENDER (text) | AGE (int) |
|---|---|---|---|
| 0001 | SHIBA, MINATO-KU, TOKYO | MALE | 42 |
| 0002 | KYOBASHI, CHUO-KU, TOKYO | FEMALE | 38 |
| 0003 | CHUO-KU, OSAKA CITY, OSAKA | MALE | 21 |
| 0004 | SHIBA, MINATO-KU, TOKYO | FEMALE | 50 |
| ... | ... | ... | ... |

FIG. 16

Temp31

SELECT T.$M.T COLUMN NAME, $R.AGGREGATE FUNCTION
($R.COLUMN NAME) from T
LEFT JOIN (select* from SOURCE TABLE NAME where
F.CONDITIONAL EXPRESSION) as Temp on T.$M.T COLUMN NAME =
Temp.$M.S COLUMN NAME
group by T.$M.T COLUMN NAME

FIG. 17

| TARGET TABLE (T) | | | | T11 |
|---|---|---|---|---|
| CUSTOMER ID (text) | PLAN (text) | DEVICE (text) | CANCELLATION (int) | |
| 0001 | P1 | APhone | 1 | |
| 0002 | P2 | APhone | 0 | |
| 0003 | P1 | BPhone | 1 | |
| 0004 | P1 | BPhone | 1 | |
| ... | ... | ... | ... | | payment (PAYMENT) TABLE — S14

| CUSTOMER ID (text) | TIME (time) | AMOUNT PAID (int) | METHOD OF PAYMENT (text) |
|---|---|---|---|
| 0001 | 2010/2/15 11:15:00 | ¥8,234 | PAID BY BANK TRANSFER |
| 0002 | 2010/2/15 23:20:00 | ¥12,345 | PAID AT CONVENIENCE STORE |
| 0003 | 2010/2/19 11:25:00 | ¥5,000 | PAID AT CONVENIENCE STORE |
| 0004 | 2010/2/14 10:10:00 | ¥921 | PAID BY BANK TRANSFER |
| 0004 | 2010/2/14 10:10:00 | ¥6,921 | PAID AT CONVENIENCE STORE |
| ... | ... | ... | ... |

JOINT INFORMATION: "T. CUSTOMER ID = payment. CUSTOMER ID"
AGGREGATION INFORMATION: "SUM (AMOUNT PAID)"
SELECTION INFORMATION: "TIME in FEBRUARY, 2010"
TABLE INFORMATION: "payment"

Temp31

SELECT T.$M.T COLUMN NAME, $R.AGGREGATE FUNCTION ($R.COLUMN NAME) from T LEFT JOIN (select* from SOURCE TABLE NAME where F.CONDITIONAL EXPRESSION) as Temp on T.$M.T COLUMN NAME = Temp.$M.S COLUMN NAME group by T.$M.T COLUMN NAME

D34

SELECT T.CUSTOMER ID, SUM (AMOUNT PAID) from T
LEFT JOIN (select* from payment where TIME in 2010/2) as Temp
on T.CUSTOMER ID = Temp.CUSTOMER ID group by T.CUSTOMER ID

FIG. 19

FEBRUARY, 2010

| CUSTOMER ID | PLAN | DEVICE | CANCELLATION | |
|---|---|---|---|---|
| 0001 | P1 | APhone | 1 | T11 |
| 0002 | P2 | APhone | 0 | |
| 0003 | P1 | BPhone | 1 | |
| 0004 | P2 | BPhone | 1 | |
| ... | ... | ... | ... | |

MARCH, 2010

| CUSTOMER ID | PLAN | DEVICE | CANCELLATION | |
|---|---|---|---|---|
| 1021 | P2 | BPhone | | T21 |

S16

| CUSTOMER ID | TIME | CALL DIRECTION | TYPE | CALL DURATION [s] |
|---|---|---|---|---|
| 0001 | 2010-1-1 10:30:00 | IN | SMS | 0 |
| 0001 | 2010-1-1 11:15:00 | OUT | call | 65 |
| 0001 | 2010-1-1 16:00:00 | OUT | call | 56 |
| 0001 | 2010-1-5 19:30:00 | IN | SMS | 80 |
| 0002 | 2010-1-28 00:01:00 | OUT | call | 20 |
| 0002 | 2010-1-30 23:10:00 | OUT | call | 350 |
| 0003 | 2010-1-4 11:58:00 | OUT | call | 88 |
| ... | ... | ... | ... | ... |
| 1021 | 2010-2-10 20:16:00 | IN | SMS | 15 |
| 1021 | 2010-2-11 20:15:00 | OUT | call | 240 |

FIG. 20

FEATURE 1: CUSTOMER'S MAXIMUM CALL DURATION
FEATURE 2: CUSTOMER'S TOTAL CALL DURATION
FEATURE 3: TOTAL COUNT OF SMS

R22

| CUSTOMER ID | PLAN | DEVICE | GENERATED FEATURE 1 | GENERATED FEATURE 2 | GENERATED FEATURE 3 | ... | CANCELLATION |
|---|---|---|---|---|---|---|---|
| 0001 | P1 | APhone | 65 | 121 | 2 | ... | 1 |
| 0002 | P2 | APhone | 350 | 370 | 0 | ... | 0 |
| 0003 | P1 | BPhone | 88 | 88 | 0 | ... | 1 |
| 0004 | P2 | BPhone | 69 | 123 | 0 | ... | 1 |
| ... | ... | ... | ... | ... | ... | ... | ... |

R23

| CUSTOMER ID | PLAN | DEVICE | GENERATED FEATURE 1 | GENERATED FEATURE 2 | GENERATED FEATURE 3 | ... |
|---|---|---|---|---|---|---|
| 1021 | P2 | BPhone | 240 | 240 | 1 | ... |

FIG. 22

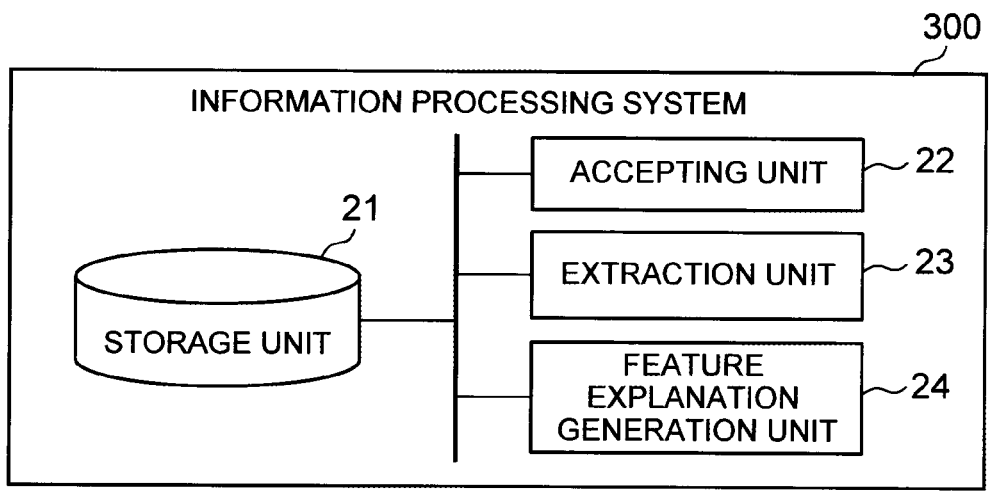

FIG. 23

Temp41

SELECT T.$M.T COLUMN NAME, $R.AGGREGATE FUNCTION ($R.COLUMN NAME) from T LEFT JOIN (select* from SOURCE TABLE NAME where F.CONDITIONAL EXPRESSION) as Temp on T.$M.T COLUMN NAME = Temp.$M.S COLUMN NAME group by T.$M.T COLUMN NAME Temp42

SELECT T.$M.T COLUMN NAME, $R.AGGREGATE FUNCTION ($R.COLUMN NAME) from T LEFT JOIN SOURCE TABLE NAME on T.$M.T COLUMN NAME = SOURCE TABLE NAME.$M.S COLUMN NAME AND F.CONDITIONAL EXPRESSION group by T.$M.T COLUMN NAME

SELECT T.CUSTOMER ID, SUM (CALL DURATION) from T LEFT JOIN (select* from call_log where CALL DIRECTION = IN) as Temp on T.CUSTOMER ID = Temp.CUSTOMER ID group by T.CUSTOMER ID Temp41

SELECT T.$M.T COLUMN NAME, $R.AGGREGATE FUNCTION ($R.COLUMN NAME) from T LEFT JOIN (select* from SOURCE TABLE NAME where F.CONDITIONAL EXPRESSION) as Temp on T.$M.T COLUMN NAME = Temp.$M.S COLUMN NAME group by T.$M.T COLUMN NAME

⇩ EXTRACT

TABLE INFORMATION: call_log
AGGREGATION INFORMATION: CALL DURATION, SUM
JOINT INFORMATION: T. CUSTOMER ID = call_log. CUSTOMER ID
SELECTION INFORMATION: CALL DIRECTION = IN

FIG. 25

START

ACCEPT A FEATURE DESCRIPTOR — S111

EXTRACT TABLE INFORMATION, JOINT INFORMATION, AGGREGATION INFORMATION(, SELECTION INFORMATION) FROM THE FEATURE DESCRIPTOR — S112

GENERATE A FEATURE EXPLANATION BY ASSIGNING THE EXTRACTED INFORMATION TO A TEMPLATE — S113

END

INFORMATION PROCESSING SYSTEM, FEATURE DESCRIPTION METHOD AND FEATURE DESCRIPTION PROGRAM

CROSS REFERENCE TO RELATED APPLICATIONS

This application is a National Stage of International Application No. PCT/JP2018/011657 filed Mar. 23, 2018, claiming priority based on U.S. Provisional Patent Application No. 62/478,882, filed Mar. 30, 2017, the disclosures of which are incorporated herein in their entirety.

This application claims priority based on U.S. Provisional Application No. 62/478,882 filed on Mar. 30, 2017, the disclosure of which is incorporated herein in its entirety.

TECHNICAL FIELD

The present invention relates to an information processing system for generating a feature for use in learning or prediction, and to a feature description method and a feature description program for describing the generated feature.

BACKGROUND ART

A process of predictive analysis is roughly divided into the following three stages.

The first stage (step) is a "pre-processing stage". In the "pre-processing stage", an attribute (or, feature) to be input for example to an apparatus that operates in accordance with a predictive analysis algorithm is processed so as to ensure effective functioning of the predictive analysis algorithm.

The second stage is an "analytical processing stage". In the "analytical processing stage", the attribute is input for example to the apparatus that operates in accordance with the predictive analysis algorithm, to obtain an analysis result as an output for example from the apparatus operating in accordance with the predictive analysis algorithm.

The third stage is a "post-processing stage". In the "post-processing stage", the analysis result is converted into an easy-to-read graph, a control signal to be input to another device, or the like.

To obtain useful knowledge from such predictive analysis, it is necessary to perform the "pre-processing stage" appropriately. How to design the procedure for the "pre-processing stage" depends on the expertise of a person (data scientist) skilled in analytical technology. The task of designing the pre-processing stage has not been supported sufficiently by information processing technology; it still depends largely on manual trial-and-error operations by the skilled person.

It is important to generate a greater number of attribute candidates for finding useful knowledge. Specifically, it is important to generate candidates for various attributes (explanatory variables) that may affect a variable (objective variable) as a target of prediction, since generating such various candidates can increase the possibility that the candidates include an attribute helpful to prediction.

For example, Patent Literature (PTL) 1 describes an attribute enumeration system that enumerates a new attribute that is a combination of attributes of learning data. The system described in PTL 1 generates a set of DNF labels each representing a way of combining logical formula expressions each expressing a combination of attributes by use of the attributes of the learning data and the maximum number of attributes to be combined.

CITATION LIST

Patent Literature

PTL 1: WO2015/186278

SUMMARY OF INVENTION

Technical Problem

Meanwhile, in the process of predictive analysis, a data analyst needs to understand the meaning of a newly generated attribute. It should be noted that an attribute may also be referred to as a feature.

PTL 1 discloses generating a new attribute, so a large number of features can be enumerated efficiently by using the system described in PTL 1. On the other hand, there is a technical problem that, as the number of features generated increases, it becomes more difficult to grasp the meanings of the respective features. It is therefore preferable that a description of a generated feature can be provided in a manner easily understandable by a data analyst, while the new feature can be generated efficiently.

In view of the foregoing, an object of the present invention is to provide an information processing system, a feature description method, and a feature description program that allow a description of a generated feature to be provided in a manner easily understandable by a human.

Solution to Problem

An information processing system according to the present invention includes: a descriptor generation unit which generates a feature descriptor by using a first template prepared in advance, the feature descriptor generating a feature that may affect a prediction target from a first table including a variable of the prediction target and a second table; a feature generation unit which generates the feature by applying the feature descriptor to the first table and the second table; a feature explanation generation unit which generates a feature explanation about the feature descriptor or the feature on the basis of a second template; and an accepting unit which accepts values to be assigned to the first template and the second template; wherein the descriptor generation unit generates the feature descriptor by assigning the accepted values to the first template, the feature explanation generation unit generates the feature explanation by assigning the values assigned to the first template to the second template, and the feature generation unit generates the feature for use as a candidate for an explanatory variable when learning a model for predicting a value of the prediction target.

Another information processing system according to the present invention includes: an accepting unit which accepts table information indicating a name of a second table to be associated with a first table including a variable of a prediction target, joint information indicating key columns when joining the first table and the second table, and aggregation information indicating an aggregation operation to be performed on a plurality of rows in the second table and a column as a target of the aggregation operation; and a feature explanation generation unit which generates a feature explanation by assigning values indicating respectively the table information, the joint information, and the aggregation information accepted by the accepting unit to a template including a table parameter to which a value indicating the table information is to be assigned, a joint parameter to which a value indicating the joint information is to be assigned, and an aggregation parameter to which a value indicating the aggregation information is to be assigned.

A feature explanation generation method according to the present invention includes: generating a feature descriptor by assigning accepted values to a first template prepared in advance, the feature descriptor generating a feature that may affect a prediction target from a first table including a variable of the prediction target and a second table; generating the feature by applying the feature descriptor to the first table and the second table, the feature being used as a candidate for an explanatory variable when learning a model for predicting a value of the prediction target; and generating a feature explanation about the feature descriptor or the feature by assigning the values assigned to the first template to a second template.

Another feature explanation generation method according to the present invention includes: accepting table information indicating a name of a second table to be associated with a first table including a variable of a prediction target, joint information indicating key columns when joining the first table and the second table, and aggregation information indicating an aggregation operation to be performed on a plurality of rows in the second table and a column as a target of the aggregation operation; and generating a feature explanation by assigning a value indicating the accepted table information, a value indicating the accepted joint information, and a value indicating the accepted aggregation information to a template including a table parameter to which a value indicating the table information is to be assigned, a joint parameter to which a value indicating the joint information is to be assigned, and an aggregation parameter to which a value indicating the aggregation information is to be assigned.

A feature explanation generation program according to the present invention causes a computer to perform: descriptor generation processing of generating a feature descriptor by using a first template prepared in advance, the feature descriptor generating a feature that may affect a prediction target from a first table including a variable of the prediction target and a second table; feature generation processing of generating the feature by applying the feature descriptor to the first table and the second table; feature explanation generation processing of generating a feature explanation about the feature descriptor or the feature on the basis of a second template; and accepting processing of accepting values to be assigned to the first template and the second template; wherein the program causes the computer to generate, in the descriptor generation processing, the feature descriptor by assigning the accepted values to the first template, generate, in the feature explanation generation processing, the feature explanation by assigning the values assigned to the first template to the second template, and generate, in the feature generation processing, the feature for use as a candidate for an explanatory variable when learning a model for predicting a value of the prediction target.

Another feature explanation generation program according to the present invention causes a computer to perform: accepting processing of accepting table information indicating a name of a second table to be associated with a first table including a variable of a prediction target, joint information indicating key columns when joining the first table and the second table, and aggregation information indicating an aggregation operation to be performed on a plurality of rows in the second table and a column as a target of the aggregation operation; and feature explanation generation processing of generating a feature explanation by assigning values indicating respectively the table information, the joint information, and the aggregation information accepted in the accepting processing to a template including a table parameter to which a value indicating the table information is to be assigned, a joint parameter to which a value indicating the joint information is to be assigned, and an aggregation parameter to which a value indicating the aggregation information is to be assigned.

Advantageous Effects of Invention

According to the present invention, the above-described technical means provide the technical effects that a description of a generated feature can be provided in a manner easily understandable by a human.

BRIEF DESCRIPTION OF DRAWINGS

FIG. 4 is a diagram illustrating an exemplary reduce process.

FIG. 7 is a diagram illustrating exemplary information for use in generating a feature descriptor.

FIG. 8 is a diagram illustrating other exemplary processing of generating a feature descriptor by applying values to a first template.

FIG. 9 is a diagram illustrating exemplary processing of generating a feature.

FIG. 13 is a diagram illustrating a modified example of the processing of generating a feature descriptor.

FIG. 14 is a diagram illustrating another modified example of the processing of generating a feature descriptor.

FIG. 15 is a diagram illustrating exemplary source tables.

FIG. 16 is a diagram illustrating an exemplary first template including a table parameter.

FIG. 17 is a diagram illustrating an exemplary method of generating a feature descriptor.

FIG. 19 is a diagram illustrating exemplary target and source tables.

FIG. 20 is a diagram illustrating exemplary features generated.

FIG. 22 is a block diagram showing an exemplary configuration of a fourth embodiment of an information processing system according to the present invention.

FIG. 23 is a diagram illustrating exemplary descriptor templates.

FIG. 24 is a diagram illustrating exemplary processing of extracting pieces of information from a feature descriptor.

FIG. 25 is a flowchart illustrating an exemplary operation of the information processing system of the fourth embodiment.

DESCRIPTION OF EMBODIMENT

Embodiments of the present invention will be described below with reference to the drawings.

Embodiment 1

Figures 1, 2:
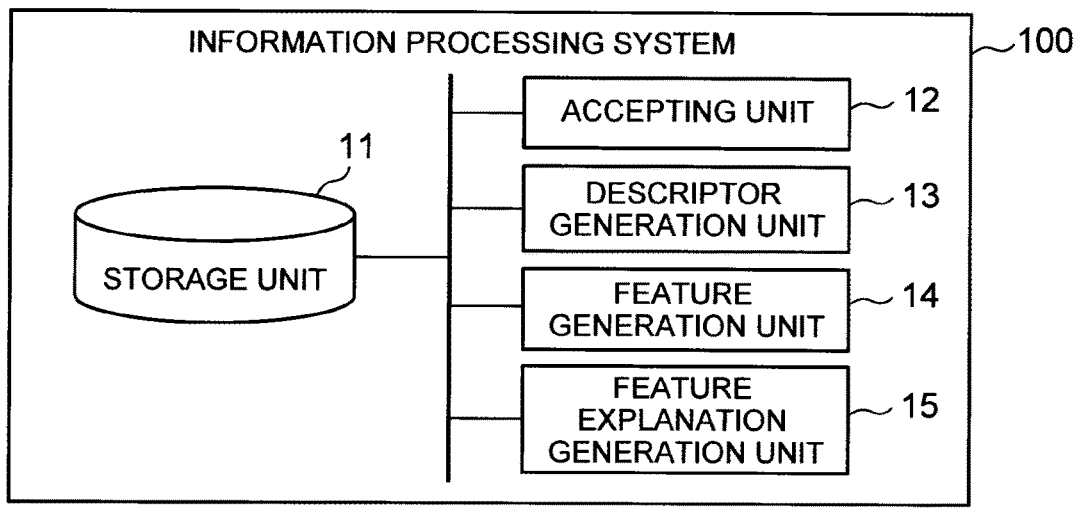
FIG. 1 is a block diagram showing an exemplary configuration of a first embodiment of an information processing system according to the present invention.
FIG. 2 is a diagram illustrating an exemplary filter process.

FIG. 1 is a block diagram showing an exemplary configuration of a first embodiment of an information processing system according to the present invention. The information processing system 100 of the present embodiment includes a storage unit 11, an accepting unit 12, a descriptor generation unit 13, a feature generation unit 14, and a feature explanation generation unit 15.

The storage unit 11 stores a table (which may be hereinafter referred to as a first table) including a variable of a prediction target (i.e. an objective variable), and an aggregate of data (which may be hereinafter referred to as first table data) included in the first table. In the following description, the first table may be referred to as a target table. The storage unit 11 also stores a table other than the first table (which may be hereinafter referred to as a second table), and an aggregate of data (which may be hereinafter referred to as second table data) included in the second table. In the following description, the second table may be referred to as a source table.

The first table and the second table are each defined by a combination of columns representing data attributes. Each table includes at least one row (or, record) as a combination of data indicating values of the respective attributes. For example, it is assumed, in a state where each customer has given consent to the handling of his/her personal information in advance, to estimate whether a certain customer will cancel his/her mobile phone contract next month, on the basis of the customer's contract information and call information histories. In this case, a target of prediction is the presence or absence of cancellation by a customer. In this case, the first table (target table) includes information identifying a customer (customer ID), and a value indicating the presence or absence of cancellation by the customer (see a target table T11 in FIG. 3, which will be described later; the column "cancellation" in the target table T11 corresponds to a prediction target (i.e., an objective variable)). Further, the second table (source table) includes pieces of information other than those in the first table (see a source table S11 in FIG. 3, which will be described later).

The first table may have granularity the same as or different from that of the second table. Here, the granularity of a table is an index that represents the fineness of the data included in the table, or more specifically, an index that represents by which term the data included in the table can be uniquely specified. For example, when each data included in a target table can be specified using an ID of a customer (customer ID), then the customer ID corresponds to the granularity of the table. In the case of a database, the granularity corresponds to a primary key, for example. Thus, a table having granularity different from that of the target table (first table) means a table having rows that do not have a one-to-one correspondence with the rows in the target table. It should be noted that first table data and second table data do not have to be stored in the storage unit 11 at the time of generating a feature descriptor, which will be described later.

The accepting unit 12 accepts inputs of pieces of information necessary for the descriptor generation unit 13 (described later) to generate a feature descriptor, and pieces of information necessary for the feature explanation generation unit 15 (described later) to generate a feature explanation describing the meaning of a feature descriptor or a feature.

The accepting unit 12 may accept the information that are received via a communication network (not shown), or it may read and accept the information from a storage device (not shown) storing such information. The storage unit 11 may also have the function as this storage device. The input content accepted by the accepting unit 12 will be described later.

In the following description, a feature means a variable that may affect a prediction target. Further, a vector of the feature (or, a feature vector) is a vector of a dimension corresponding to the number of rows in the first table, and it is data that means an explanatory variable (predictor variable). It should be noted that information made up of a plurality of feature vectors may be referred to as a feature table. A feature descriptor is specifically a function for generating a feature vector. That is, to generate a feature means to generate a feature vector. On the other hand, to design a feature means to design a feature descriptor. In the following description, a feature and a feature vector will both be expressed as a "feature".

The descriptor generation unit 13 generates a feature descriptor by using the information accepted by the accepting unit 12. The feature descriptor is used for generating a feature being a variable that may affect a prediction target (i.e. an objective variable) from the first and second tables.

A feature becomes a candidate for an explanatory variable when generating a model using machine learning. In other words, using the feature descriptor generated in the present embodiment makes it possible to automatically generate a candidate for the explanatory variable when generating a model using machine learning.

The descriptor generation unit 13 generates a feature descriptor by using a template (hereinafter, referred to as a first template) prepared in advance. The first template includes, for example, three parameters. Specifically, the accepting unit 12 accepts, as values to be assigned to the first template, values to be assigned to the three parameters. The descriptor generation unit 13 assigns the accepted values to the corresponding parameters in the first template, to generate a feature descriptor. The content of the parameters included in the first template will now be described.

The first parameter is a parameter that represents a condition for extracting row(s) included in a second table. More specifically, the first parameter is assigned a value (hereinafter, referred to as selection information) that indicates a condition for selecting any row fulfilling the condition from the second table and a column as a target of the selection. In the following description, the first parameter may be referred to as a selection parameter. The selection information indicated by the first parameter may be defined as a conditional expression with respect to a source table (second table). Hereinafter, the process of extracting row(s) from a second table on the basis of the first parameter may be referred to as a "filter" process, and a list of such conditional expressions may be referred to as an "F list".

The extraction condition is arbitrary, which may be, for example, a condition of determining whether the value is equal to (or greater than or smaller than) the value in the designated column.

FIG. 2 is a diagram illustrating an exemplary filter process. A source table S11 (second table) illustrated in FIG. 2 is a table including customers' call logs (specifically, time of call, direction of call, type of call, and duration of call). In the example shown in FIG. 2, the source table S11 includes, as attributes, "customer ID", "time", "call direction", "type", and "call duration". It is here assumed that as the first parameter, the attribute "call direction" has been designated as the column as a target of selection, and the value "OUT" indicative of the attribute "call direction" has been designated as the selection condition. In this case, a table R11 including the rows fulfilling the call direction=OUT is selected from the source table. "Call direction=OUT" shown in FIG. 2 corresponds to the selection information.

The second parameter is a parameter that represents a correspondence condition between a column in the first table and a column in the second table. More specifically, the second parameter is assigned a value (hereinafter, referred to as joint information) that indicates key columns for use in joining the first and second tables. In the following description, the second parameter may be referred to as a joint parameter. The joint information indicated by the second parameter may be defined as a pair of columns for associating the column in the target table (first table) with the column in the source table (second table). Hereinafter, the process of associating the columns in the tables on the basis of the second parameter may be referred to as a "map" process. Further, a list of such column pairs may be referred to as an "M list". Associating the columns in the tables by a map process may also be explained as joining a plurality of tables into one table by the associated columns.

Figure 3:
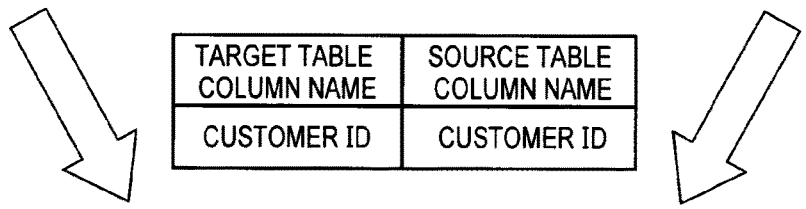
FIG. 3 is a diagram illustrating an exemplary map process.

FIG. 3 is a diagram illustrating an exemplary map process. A target table T11 (first table) illustrated in FIG. 3 is a table that includes a customer ID for identifying a customer, and a variable indicating the presence or absence of cancellation. The target table T11 illustrated in FIG. 3 includes, as attributes, "customer ID", "plan", "device", and "(presence or absence of) cancellation". It should be noted that the source table S11 illustrated in FIG. 3 has the same content as the source table S11 illustrated in FIG. 2.

It is assumed that, in the example shown in FIG. 3, the "customer ID" column in the target table T11 and the "customer ID" column in the source table S11 have been designated as the key columns for joining in the second parameter. This parameter means that the target table T11 and the source table S11 are to be joined by the "customer ID" columns in the respective tables. In the case where the tables differ in granularity from each other, values of the attributes included in the target table are expanded in accordance with the "customer ID" column in the source table. As a result, one table R12 is generated from the two tables.

"Target table column name: customer ID, source table column name: customer ID" shown in FIG. 3 corresponds to the joint information.

The third parameter is a parameter that indicates the way of aggregating a plurality of rows with regard to a certain column included in the second table. More specifically, the third parameter is assigned a value (hereinafter, referred to as aggregation information) that indicates an aggregation operation to be performed on a plurality of rows in the second table when joining the first and second tables and a column as a target of the aggregation operation. For example, in the case where the column designated by the joint information in the target table is the primary key, once a value in the column designated by the joint information is determined, a value in the objective variable column is uniquely determined. In this case, with the reduce process, the number of records with regard to a certain column in the source table is consequently aggregated to the same number as the number of records with regard to the objective variable column.

In the following description, the third parameter may be referred to as an aggregation parameter. The aggregation information indicated by the third parameter may be defined as an aggregate function with respect to a column in the source table (second table). Hereinafter, the process of aggregating data in a column by the method indicated by the third parameter may be referred to as a "reduce" process. Further, a list of such aggregate functions may be referred to as an "R list".

The method of aggregation is arbitrary; examples include a total count, maximum value, minimum value, mean value, median value, and variance in a column. The total count in a column may be calculated either by excluding or including redundant data.

FIG. 4 is a diagram illustrating an exemplary reduce process. A table R13 illustrated in FIG. 4 indicates some of the columns in the table R12 illustrated in FIG. 3. In the example shown in FIG. 4, it is assumed that as the third parameter, extraction of the maximum value has been designated as the aggregation operation to be performed on the second table and the call duration has been designated as a target column of the aggregation operation. In this case, a table R14 is generated as a result of selecting the maximum value of the call duration for each "customer ID" as the key. "Column name: call duration, aggregate function: MAX" shown in FIG. 4 corresponds to the aggregation information.

Figure 5:
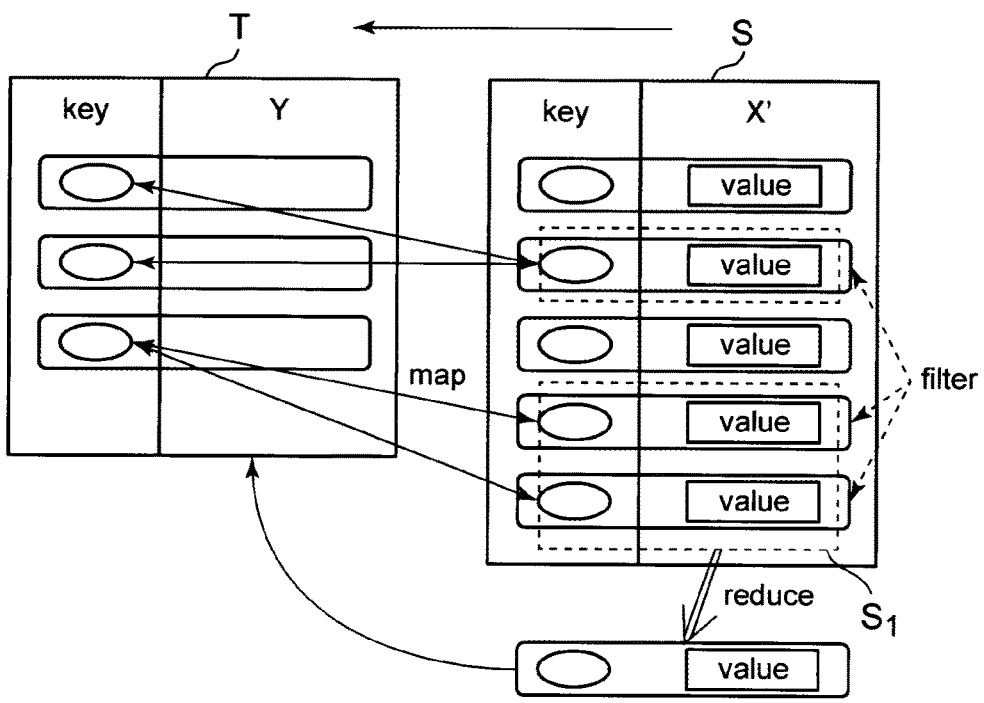
FIG. 5 is a diagram illustrating exemplary processing indicated by respective parameters.

FIG. 5 is a diagram illustrating exemplary processing indicated by the parameters. In the example shown in FIG. 5, there are one target table T and one source table S, and the key columns are the columns for associating the tables. The Y column in the target table is an objective variable. $S_1$ in FIG. 5 is a subset of a set of columns in the source table S.

Firstly, in the filter process, rows in the source table S in which the value in the X' column fulfills a certain condition are selected to generate a subset $S_1$. Next, in the map process, the rows in the target table T and the rows in the source table S are joined via the key columns in the respective tables. For example, the columns having the same values in the key columns are joined. Then, in the reduce process, an aggregation operation is performed by using the values in the set of the rows selected in the filter process out of the columns in the source table S associated in the map process with the rows in the target table T.

Figure 6:
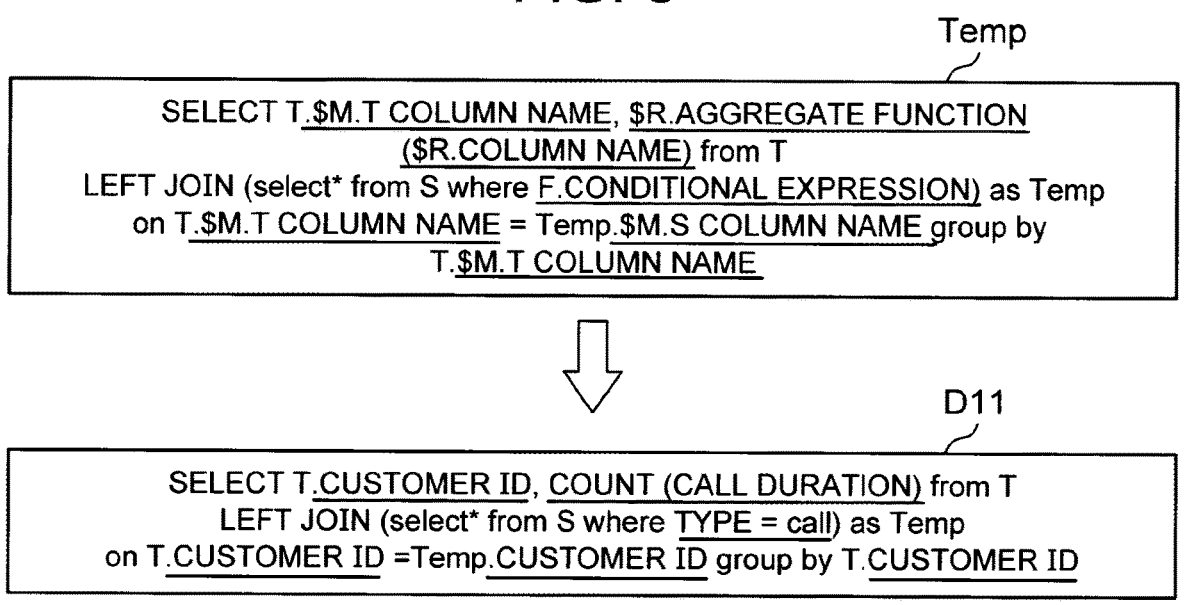
FIG. 6 is a diagram illustrating exemplary processing of generating a feature descriptor by applying values to a first template.

FIG. 6 is a diagram illustrating exemplary processing of generating a feature descriptor by applying values to a first template. The first template Temp illustrated in FIG. 6 has underlined portions corresponding to the respective parameters. In the template illustrated in FIG. 6, T means the first table, and S means the second table. Further, "$M. T column name" indicates the key column in the first table, included in the second parameter. "$R. aggregate function ($R. column name)" indicates the aggregation operation and the column as a target of the aggregation operation, included in the third parameter. "F. conditional expression" indicates the condition for selecting row(s) from the second table, included in the first parameter. "$M. S column name" indicates the key column in the second table, included in the second parameter. The descriptor generation unit 13 assigns the accepted parameter values to the respective parameters, to thereby generate a feature descriptor.

For example, it is assumed that the accepting unit 12 has accepted "call direction=IN" as the selection information, "T. customer ID=S. customer ID" as the joint information, and "call duration=COUNT" as the aggregation information. At this time, the descriptor generation unit 13 assigns "call direction=IN" to the first parameter, "T. customer ID=S. customer ID" to the second parameter, and "call duration=COUNT" to the third parameter, to generate a feature descriptor D11.

The first template may be prepared in accordance with SQL as a query language, as illustrated in FIG. 6. In this case, the descriptor generation unit 13 may generate a feature descriptor by applying the extraction condition, correspondence condition, and aggregation method to a template for generating an SQL statement. Therefore, the feature descriptor can be defined as a query with respect to the first and second tables. While a relational database will be illustrated in the following description, the present invention is similarly applicable to the case of an abstract data structure as used in a framework for executing distributed processing.

Further, when the accepting unit 12 accepts a plurality of pieces of joint information, aggregation information, or selection information, the descriptor generation unit 13 may generate a plurality of combinations of the accepted joint information, aggregation information, and selection information, and generate a feature descriptor for each of the generated combinations.

A procedure for the descriptor generation unit 13 to generate a plurality of feature descriptors will now be described specifically. FIG. 7 is a diagram illustrating exemplary information for use in generating feature descriptors. In the example shown in FIG. 7, it is assumed that a variable as a prediction target (i.e. an objective variable) is a variable indicating the presence or absence of cancellation by a customer. The target table T11 and the source table S11 have the same contents as those illustrated in FIGS. 2 and 3.

An F list is a list of selection information to be assigned to the first parameter. The F list shown in FIG. 7 includes 18 candidates for the selection information. An M list is a list of joint information to be assigned to the second parameter. The M list shown in FIG. 7 includes one candidate for the joint information. An R list is a list of aggregation information to be assigned to the third parameter. The R list shown in FIG. 7 includes six candidates for the aggregation information.

It should be noted that the F, M, and R lists may be created automatically by a machine or manually by a human. Here, it is assumed that the F, M, and R lists illustrated in FIG. 7 have been created in advance.

Firstly, the descriptor generation unit 13 selects a candidate from each of the F, M, and R lists, to generate a combination of the candidates. For example, as one combination, the descriptor generation unit 13 selects "call direction=IN" from the F list, "T. customer ID=S. customer ID" from the M list, and "call duration=COUNT" from the R list. Alternatively, the descriptor generation unit 13 may select, for example, "call direction=OUT and type=call" from the F list, "T. customer ID=S. customer ID" from the M list, and "time=MAX" from the R list. In the example shown in FIG. 7, the F list includes 18 conditional expressions, the M list includes one correspondence condition, and the R list includes six aggregation methods. Accordingly, 108 combinations are generated from the candidates in the lists.

Next, the descriptor generation unit 13 generates a feature descriptor for each of the generated combinations. Specifically, the descriptor generation unit 13 assigns the joint information, aggregation information, and selection information included in the generated combination to the first template, to thereby generate a feature descriptor. In the above example, the joint information corresponds to the candidate selected from the M list, the aggregation information corresponds to the candidate selected from the R list, and the selection information corresponds to the candidate selected from the F list.

For example, in the case where SQL is used as a query language, the feature descriptor is defined as an SQL statement, and the three candidate values selected from the F, M, and R lists, respectively, are assigned to the parameters for generating the SQL statement.

FIG. 8 is a diagram illustrating other exemplary processing of generating a feature descriptor by applying values to a first template. The template illustrated in FIG. 8 has the same content as the template Temp illustrated in FIG. 6, and the template is prepared in advance. The descriptor generation unit 13 generates a feature descriptor by applying the joint information, aggregation information, and selection information to the underlined parameters in the template Temp.

The way of generating a feature descriptor is unchanged even when a plurality of combinations are generated. For example, it is assumed as illustrated in FIG. 8 that a combination has been generated with the conditional expression "call direction=IN" selected from the F list, the correspondence condition "associate by the customer IDs" from the M list, and the aggregation method "count in the column of call duration" from the R list. In this case, the descriptor generation unit 13 applies this combination to the template Temp to generate a feature descriptor D21 illustrated in FIG. 8. The feature expressed by this feature descriptor D21 indicates the total count of the income calls or received messages.

Alternatively, it is assumed as illustrated in FIG. 8 that a combination has been generated with the conditional expression "call direction=OUT AND type=call" selected from the F list, the correspondence condition "associate by the customer IDs" from the M list, and the aggregation method "max in time" from the R list. In this case, the descriptor generation unit 13 applies this combination to the template Temp to generate a feature descriptor D22 illustrated in FIG. 8. The feature expressed by this feature descriptor D22 indicates the latest time when a voice call was made.

Various features other than those illustrated above can be generated. For example, assume that a combination has been generated with the conditional expression "type=call AND call direction=OUT AND HOUR (time)<7" selected from the F list, the correspondence condition "associate by the customer IDs" from the M list, and the aggregation method "mean in call duration" from the R list. The feature expressed by this combination indicates the average duration of the voice calls made before seven o'clock.

Further, assume that a combination has been generated with the conditional expression "type=call AND call direction=IN" selected from the F list, the correspondence condition "associate by the customer IDs" from the M list, and the aggregation method "variance in call duration" from the R list. The feature expressed by this combination indicates the degree of variation in call duration of the income calls.

The feature generation unit 14 generates a feature (specifically, a feature vector) by applying the generated feature descriptor to the first and second tables. The feature generation unit 14 generates a feature that is used as a candidate for an explanatory variable when learning a model for predicting a value of a prediction target.

The feature generation unit 14 generates a feature, by the feature descriptor using the above-described parameters, on the basis of the following processing. Firstly, the feature generation unit 14 performs a filter process in which it extracts one or more rows from a source table on the basis of the extraction condition on the source table designated by the first parameter.

Next, the feature generation unit 14 performs a map process in which it associates a target table and the source table with each other via the joint information designated by the second parameter. It should be noted that, when associating the target and source tables, the rows associated are not limited to those having exactly the same values in the columns indicated by the joint information. The rows may be associated dependent on designated similarity. For example, when associating the tables in accordance with day and time data, the rows associated are not limited to those having the completely identical day and time; two rows having the difference in day and time within a prescribed range (for example, within six hours) may be associated with each other. Another conceivable example is that, in the case where a target table and a source table both have a column of longitude and latitude and the longitude and latitude are used to describe a correspondence condition, the rows may be associated when the distance between the two points is within a prescribed range (for example, within five kilometers).

Next, the feature generation unit 14 performs a reduce process in which it aggregates, out of the rows that have been selected by the filter process, those associated by the map process with the rows in the target table, on the basis of the aggregation method designated by the third parameter. With this aggregation, a vector including values obtained for the respective rows in the target table is yielded as a feature.

FIG. 9 is a diagram illustrating exemplary processing of generating a feature. In the example shown in FIG. 9, it is assumed that the target table T11 illustrated in FIG. 2 and the source table S11 illustrated in FIG. 3 are utilized to generate a feature: "customer's maximum call duration". In this case, the first parameter is assigned the selection information "type=call", the second parameter is assigned the joint information "T. customer ID=S. customer ID", and the third parameter is assigned the aggregation information "call duration=MAX". As a result, a feature descriptor D31 illustrated in FIG. 9 is generated.

The feature generation unit 14 applies this feature descriptor D31 to the target table T11 and the source table S11, to generate a feature R21 indicating the "customer's maximum call duration". The feature generation unit 14 preferably outputs data in the form where the column designated by the joint information (here, customer ID) and the generated feature are linked, as shown for example in the table R21 in FIG. 9.

The feature explanation generation unit 15 generates a feature explanation about the generated feature descriptor or feature. The feature explanation generated in the present embodiment expresses an abstract feature generation model in natural language; it is a statement that represents the meaning of the feature descriptor or the feature. That is, the feature explanation may be an explanation of the feature itself, or it may be an explanation of the feature descriptor.

Specifically, the feature explanation generation unit 15 generates a feature explanation about a feature descriptor or a feature on the basis of a template (hereinafter, referred to as a second template). The information assigned to the first template is assigned to the second template as well. That is, the feature explanation generation unit 15 generates a feature explanation by assigning the values assigned to the first template also to the second template.

The second template includes: a table template which generates a part (table label) of the feature explanation from information on the source table (hereinafter, referred to as table information); a joint template which generates a part (joint label) of the feature explanation from the joint parameter; an aggregation template which generates a part (aggregation label) of the feature explanation from the aggregation parameter; and a selection template which generates a part (selection label) of the feature explanation from the selection parameter. The second template further includes a label template which generates the feature explanation from label parameters to which the table label, the joint label, the aggregation label, and the selection label are assigned.

The feature explanation generation unit 15 assigns the table information to the table parameter to generate a table label, which is expressed in natural language, from the table template. The table information may be information explicitly accepted by the accepting unit 12, or it may be specified by the feature explanation generation unit 15 from the selection parameter, the joint parameter, or the aggregation parameter.

Similarly, the feature explanation generation unit 15 assigns the joint information to the joint parameter to generate a joint label, expressed in natural language, from the joint template. Further, the feature explanation generation unit 15 assigns the aggregation information to the aggregation parameter to generate an aggregation label, expressed in natural language, from the aggregation template. Further, the feature explanation generation unit 15 assigns the selection information to the selection parameter to generate a selection label, expressed in natural language, from the selection template.

The feature explanation generation unit 15 then assigns the table label, the joint label, the aggregation label, and the selection label to the respective label parameters, to thereby generate a feature explanation from the label template.

Figure 10:
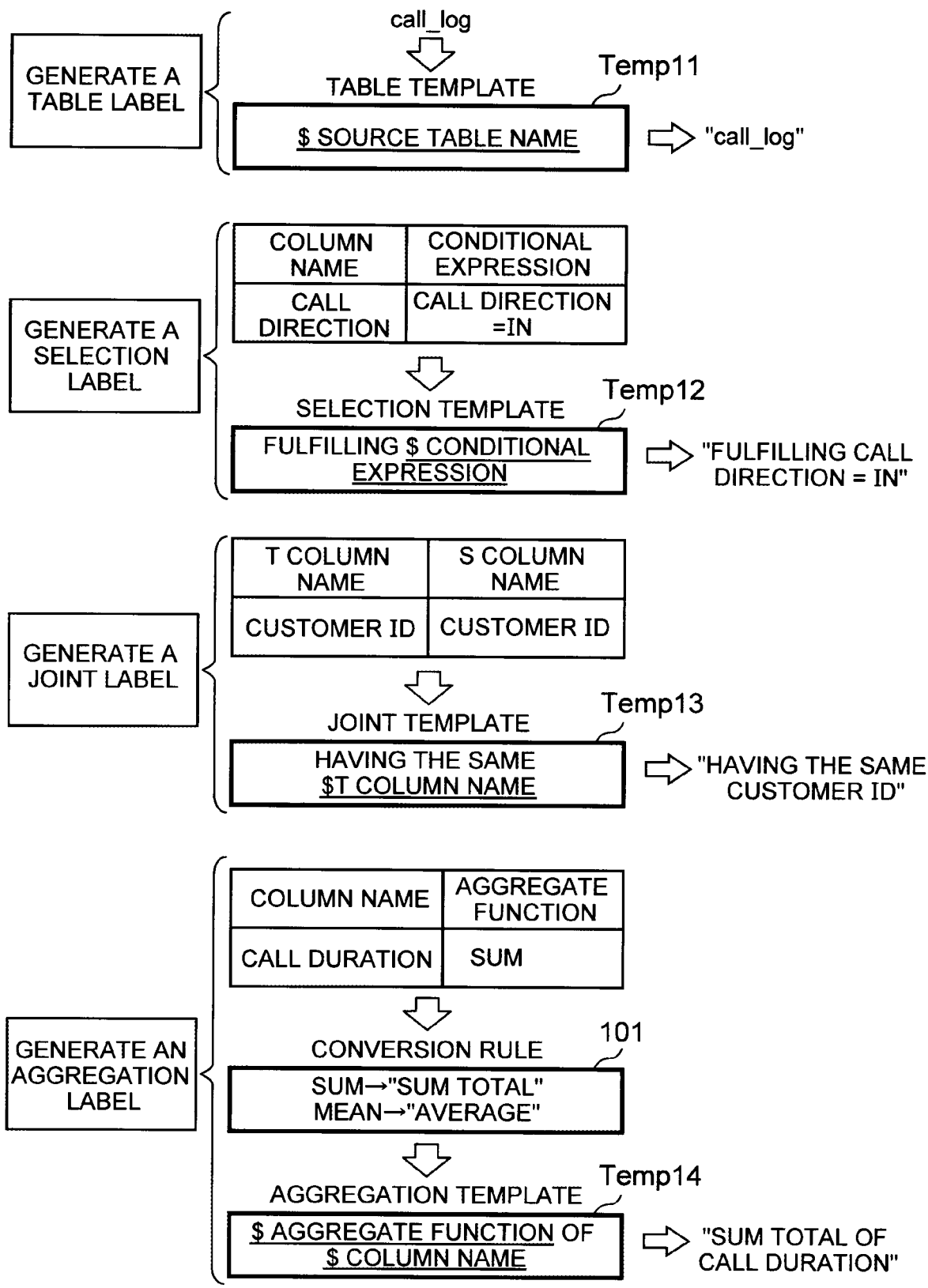
FIG. 10 is a diagram illustrating exemplary processing of generating labels.

FIG. 10 is a diagram illustrating exemplary processing of generating labels. For generation of a table label, a table template Temp11 as illustrated in FIG. 10 is used. In the table template Temp11, "$ source table name" represents the table parameter. For example, the table parameter is assigned a value representing the second table in the joint information that has been assigned to the first template. When the feature explanation generation unit 15 accepts the name "call_log" of the second table as the table information, for example, the feature explanation generation unit 15 assigns the name to the table parameter "$ source table name", to generate a table label "call_log", expressed in natural language, from the table template Temp11. It should be noted that if the table information is obvious, as in the case where there is only one second table, for example, the table information does not necessarily have to be accepted explicitly; the table information may have been assigned to the table parameter in advance.

Similarly, for generation of a selection label, a selection template Temp12 as illustrated in FIG. 10 is used. In the selection template Temp12, "$ conditional expression" represents the selection parameter. The selection parameter is assigned the selection information that has been assigned to the first template. When the feature explanation generation unit 15 accepts "call direction=IN" as the selection information, for example, the feature explanation generation unit 15 assigns the value to the selection parameter "$ conditional expression", to generate a selection label "fulfilling call direction=IN", expressed in natural language, from the selection template Temp12.

Similarly, for generation of a joint label, a joint template Temp13 as illustrated in FIG. 10 is used. In the joint template Temp13, "$ T column name" represents the joint parameter. The joint parameter is assigned the joint information that has been assigned to the first template. When the feature explanation generation unit 15 accepts "T. customer ID=S. customer ID" as the joint information, for example, the feature explanation generation unit 15 assigns the value to the joint parameter "$ T column name", to generate a joint label "having the same customer ID", expressed in natural language, from the joint template Temp13.

Similarly, for generation of an aggregation label, an aggregation template Temp14 as illustrated in FIG. 10 is used. In the aggregation template Temp14, "$ column name" and "$ aggregate function" represent the aggregation parameter. The aggregation parameter is assigned the aggregation information that has been assigned to the first template.

Here, the aggregate function may not have been expressed in natural language. Thus, a conversion rule according to the aggregate function may be defined in advance, and the feature explanation generation unit 15 may convert the aggregation information on the basis of the conversion rule. For example, assume that the feature explanation generation unit 15 has accepted "call duration=SUM" as the aggregation information and that a conversion rule 101 illustrated in FIG. 10 has been defined in advance. In this case, the feature explanation generation unit 15 converts the aggregate function "SUM" to "sum total" on the basis of the conversion rule 101.

The feature explanation generation unit 15 then assigns the aggregation information and the converted aggregate function name to the aggregation parameter "$ column name" and "$ aggregate function", respectively, to generate an aggregation label "sum total of call duration", expressed in natural language, from the aggregation template Temp14.

Figure 11:
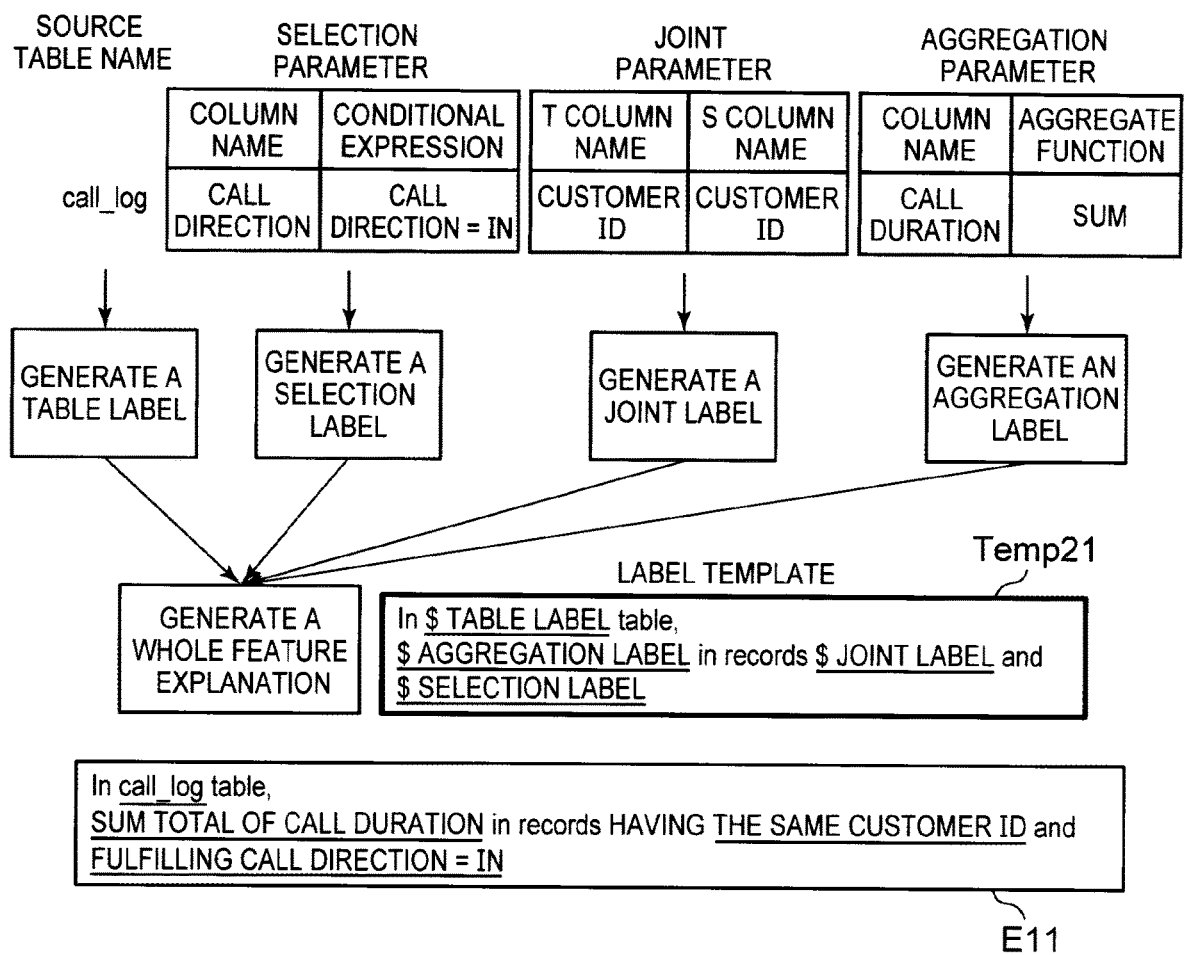
FIG. 11 is a diagram illustrating exemplary processing of generating a feature explanation from the generated labels.

FIG. 11 is a diagram illustrating exemplary processing of generating a feature explanation from the generated labels. For generation of a feature explanation, a label template Temp21 as illustrated in FIG. 11 is used. In the label template Temp21, "$ table label", "$ joint label", "$ selection label", and "$ aggregation label" represent the label parameters.

The feature explanation generation unit 15 generates a feature explanation from the label template by applying the table label, the joint label, the aggregation label, and the selection label to the corresponding label parameters. Applied to the label parameters are the generated table, joint, aggregation, and selection labels. For example, the feature explanation generation unit 15 applies the table label "call_ log", the joint label "having the same customer ID", the aggregation label "sum total of call duration", and the selection label "fulfilling call direction=IN", generated in FIG. 10, to the respective label parameters, to thereby generate a feature explanation E11 from the label template Temp21.

While the conversion rule 101 for converting the aggregate function into another expression has been described above, the processing of converting a value to be assigned is not limited to the case of generating the aggregation label, and the conversion rule is also not limited to the dictionary type conversion as described above. The feature explanation generation unit 15 may define various conversion rules in accordance with anticipated inputs.

An example of such conversion rules is to remove unnecessary letters. In the example described above, when "call_ log" has been accepted as the table information, the feature explanation generation unit 15 may determine that the underline connecting the words is unnecessary and generate "call log" by removing the underline.

Further, the feature explanation generation unit 15 may translate the generated label into another language. Assume that a table label "call log" has been generated in the above example. At this time, the feature explanation generation unit 15 may perform translation from English to Japanese to obtain "tsuwa kiroku", a Japanese equivalent of "call log". With these process steps, a label "call_log table", for example, can be converted into a label "tsuwa kiroku teburu", a Japanese equivalent of "call log table".

In the case where there is known an expression corresponding to a certain period of time, the feature explanation generation unit 15 may convert the period expressed by a generated label to that known expression. For example, the "period from six o'clock to twelve o'clock" can be generally called "in the morning". In this case, the feature explanation generation unit 15 may convert the conditional expression indicating the "period from six o'clock to twelve o'clock" (HOUR (time)>6 and HOUR (time)<12) into "time in the morning". This allows a human to more readily understand the description of the feature generated.

Further, in the case where a plurality of feature descriptors (or a plurality of features) and a plurality of feature explanations have been generated at one time, the feature explanation generation unit 15 associates the generated feature descriptors (or features) with the generated feature explanations. In this case, the feature explanation generation unit 15 operates as a feature explanation appointing unit. Specifically, the feature explanation generation unit 15 considers that the feature descriptor and the feature explanation that have been generated on the basis of the same value combination (of the necessary information from among the table information, selection information, joint information, and aggregation information) correspond to each other. In the case of associating the features with the feature explanations, the feature explanation generation unit 15 associates them in a similar manner.

The storage unit 11 is implemented, for example, by a magnetic disk device. The accepting unit 12, the descriptor generation unit 13, the feature generation unit 14, and the feature explanation generation unit 15 are implemented by a CPU of a computer that operates in accordance with a program (feature description program). For example, the program may be stored in the storage unit 11, and the CPU may read the program and operate as the accepting unit 12, the descriptor generation unit 13, the feature generation unit 14, and the feature explanation generation unit 15 in accordance with the program. Further, the functions of the present information processing system may be provided in the form of Software as a Service (SaaS).

Alternatively, the accepting unit 12, the descriptor generation unit 13, the feature generation unit 14, and the feature explanation generation unit 15 may each be implemented by dedicated hardware. The accepting unit 12, the descriptor generation unit 13, the feature generation unit 14, and the feature explanation generation unit 15 may each be implemented by general-purpose or dedicated circuitry. Here, the general-purpose or dedicated circuitry may be configured by a single chip, or by a plurality of chips connected via a bus. Further, in the case where some or all of the components of the devices are implemented by a plurality of information processing devices or circuits, such information processing devices or circuits may be arranged in a centralized or distributed manner. For example, the information processing devices or circuits may be implemented in the form of a client and server system, a cloud computing system, or the like where they are connected via a communication network.

Figure 12:
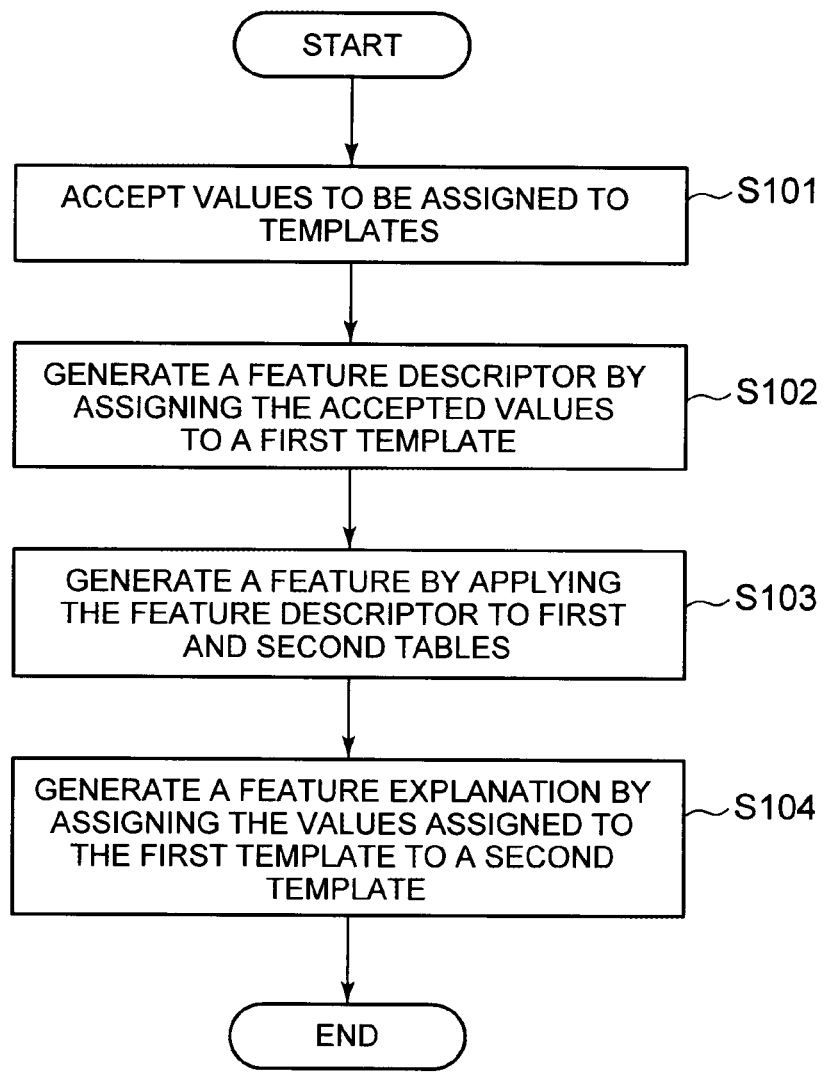
FIG. 12 is a flowchart illustrating an exemplary operation of the information processing system of the first embodiment.

A description will now be given of an operation of the information processing system of the present embodiment. FIG. 12 is a flowchart illustrating an exemplary operation of the information processing system of the first embodiment. The accepting unit 12 accepts values to be assigned to each template (i.e., necessary information from among the table information, selection information, joint information, and aggregation information) (step S101). The descriptor generation unit 13 assigns the accepted values to a first template, to generate a feature descriptor (step S102). The feature generation unit 14 applies the feature descriptor to first and second tables, to generate a feature (step S103). The feature explanation generation unit 15 assigns the values assigned to the first template to a second template, to generate a feature explanation (step S104). It should be noted that the step S104 does not necessarily have to be performed after the step S102 or S103. For example, the step S104 may be performed immediately after the step S101.

As described above, in the present embodiment, the descriptor generation unit 13 assigns accepted values to a first template to generate a feature descriptor, and the feature generation unit 14 applies the feature descriptor to first and second tables to generate a feature which is used as a candidate for an explanatory variable when learning a model for predicting a value of a prediction target. The feature explanation generation unit 15 then assigns the values assigned to the first template to a second template, to generate a feature explanation about the feature descriptor or the feature. Accordingly, a description of the generated feature can be provided in a manner easily understandable by a human.

That is, in the present embodiment, the first template, created in accordance with a query language typified by an SQL statement, and the second template, having the common parameters with the first template, are used to generate a feature explanation. It is therefore possible to generate a feature descriptor (or a feature) and provide a feature explanation of the feature descriptor (or the feature) in a manner easily understandable by a human.

A description will now be given of a first modification to the information processing system of the present embodiment. In the first embodiment, the description was given of the case where the accepting unit 12 accepts the joint information, indicating a value to be assigned to the joint parameter, the aggregation information, indicating a value to be assigned to the aggregation parameter, and the selection information, indicating a value to be assigned to the selection parameter. By contrast, in a case of selecting all the rows from the second table, the selection information becomes unnecessary.

In such a case, the descriptor generation unit 13 can generate a feature descriptor by using the joint parameter and the aggregation parameter described in the first embodiment. In this case, the first and second templates only need to include the joint parameter and the aggregation parameter. The accepting unit 12 only needs to accept the joint information and the aggregation information. In this case, the feature explanation generation unit 15 may generate a feature explanation by using only these two parameters (joint parameter and aggregation parameter).

Specifically, the descriptor generation unit 13 assigns the accepted joint information and aggregation information to the first template to generate a feature descriptor. The feature generation unit 14 applies the generated feature descriptor to the first and second tables to generate a feature. The feature explanation generation unit 15 assigns the information assigned to the first template (i.e. the joint information and the aggregation information) to the second template, to generate a feature explanation.

FIG. 13 is a diagram illustrating a modified example of the processing of generating a feature descriptor. It is assumed that a source table S12 illustrated in FIG. 13 includes call logs of only the type=call. In this case, all the data included in the source table S12 become a target of generation of a feature. The selection information thus becomes unnecessary. In this case, the descriptor generation unit 13 may assign the accepted joint information "T. customer ID=S. customer ID" and aggregation information "call duration=MAX" to the first template to generate a feature descriptor D32.

It should be noted that when the first template includes a selection parameter, the descriptor generation unit 13 may generate a feature descriptor by assigning a dummy condition (for example, 1=1) to the selection parameter. At this time, the feature explanation generation unit 15 may generate a feature explanation E12 by applying a selection label representing a dummy condition (for example, "all involved") to the second template.

A description will now be given of a second modification to the information processing system of the present embodiment. In the first embodiment, the description was given of the case where the rows in the first table and the rows in the second table have a one-to-many correspondence when joining the first and second tables. By contrast, in a case where the first table and the second table have a one-to-one correspondence, the aggregation information becomes unnecessary.

In such a case, the descriptor generation unit 13 can generate a feature descriptor by using the joint parameter and the selection parameter described in the first embodiment. In this case, the first template and the second template only need to include the joint parameter and the selection parameter. Further, the accepting unit 12 only needs to accept the joint information and the selection information. In this case, the feature explanation generation unit 15 may generate a feature explanation by using only these two parameters (joint parameter and selection parameter).

Specifically, the descriptor generation unit 13 assigns the accepted joint information and selection information to the first template to generate a feature descriptor. The feature generation unit 14 applies the generated feature descriptor to the first table and the second table to generate a feature. The feature explanation generation unit 15 assigns the information assigned to the first template (i.e. the joint information and the selection information) to the second template, to generate a feature explanation.

FIG. 14 is a diagram illustrating another modified example of the processing of generating a feature descriptor. A source table S13 illustrated in FIG. 14 is a table that includes age, gender, and address of customers. In this case, the target table T11 and the source table S13 have a one-to-one correspondence. The aggregation information thus becomes unnecessary. In this case, when it is desired to generate a feature targeting the age of male and female, the descriptor generation unit 13 may assign the accepted joint information "T. customer ID=S. customer ID" and the accepted selection information "gender=male or female" to the first template, to generate a feature descriptor D33.

It should be noted that when the first template includes an aggregation parameter, the descriptor generation unit 13 may generate a feature descriptor by assigning a dummy condition (for example, mode: MODE (age)) to the aggregation parameter. At this time, the feature explanation generation unit 15 may generate a feature explanation E13 by applying an aggregation label (for example, "age"), with the aggregate function eliminated, to the second template.

Embodiment 2

A second embodiment of the information processing system according to the present invention will now be described. In the first embodiment, the way of generating a feature and a feature explanation without accepting information on a second table was described. In the present embodiment, the case of explicitly accepting the table information will be described. It should be noted that the configuration of the present embodiment is the same as that of the first embodiment.

In the present embodiment, the first template and the second template include a table parameter to which a value identifying the second table is assigned. The accepting unit 12 accepts, in addition to the joint information, the aggregation information, and the selection information, table information that is a value to be assigned to the table parameter. It should be noted that the first and second tables may have granularity equal to or different from each other.

FIG. 15 is a diagram illustrating a plurality of exemplary source tables. The source table S14 illustrated in FIG. 15 is an exemplary payment table, which has a one-to-many correspondence with a target table. The source table S15 illustrated in FIG. 15 is an exemplary query table to a call center, which has a one-to-(0 to many) correspondence with a target table. The source table S13 illustrated in FIG. 15 is a customer table, which has the same content as illustrated in FIG. 14, and has a one-to-one correspondence with a target table.

FIG. 16 is a diagram illustrating an exemplary first template including a table parameter. The first template Temp31 illustrated in FIG. 16 includes "source table name" as the table parameter. When a plurality of source tables are to be utilized, the accepting unit 12 may accept the table information including a source table name every time a feature descriptor is to be generated.

FIG. 17 is a diagram illustrating an exemplary method of generating a feature descriptor. It is assumed that the target table T11 and the source table S14 illustrated in FIG. 17 are used to generate a feature: "total amount paid by customer in February, 2010". At this time, the accepting unit 12 accepts "T. customer ID=payment. customer ID" as the joint information, "SUM (amount paid)" as the aggregation information, and "time in February, 2010" as the selection information. In addition to these pieces of information, the accepting unit 12 further accepts a table name "payment" as the table information. The descriptor generation unit 13 assigns the accepted pieces of information to the first template Temp31 illustrated in FIG. 16, for example, to generate a feature descriptor D34.

As described above, in the present embodiment, the first template and the second template further include a table parameter to which a value identifying the second table is assigned. The accepting unit 12 further accepts table information which is a value to be assigned to the table parameter. With this configuration as well, a description of the generated feature can be provided in a manner easily understandable by a human.

Embodiment 3

A third embodiment of the information processing system according to the present invention will now be described. The information processing system of the present embodiment creates training data on the basis of a generated feature, uses the created training data to learn a predictive model, and uses the predictive model to output a predicted result.

Figure 18:
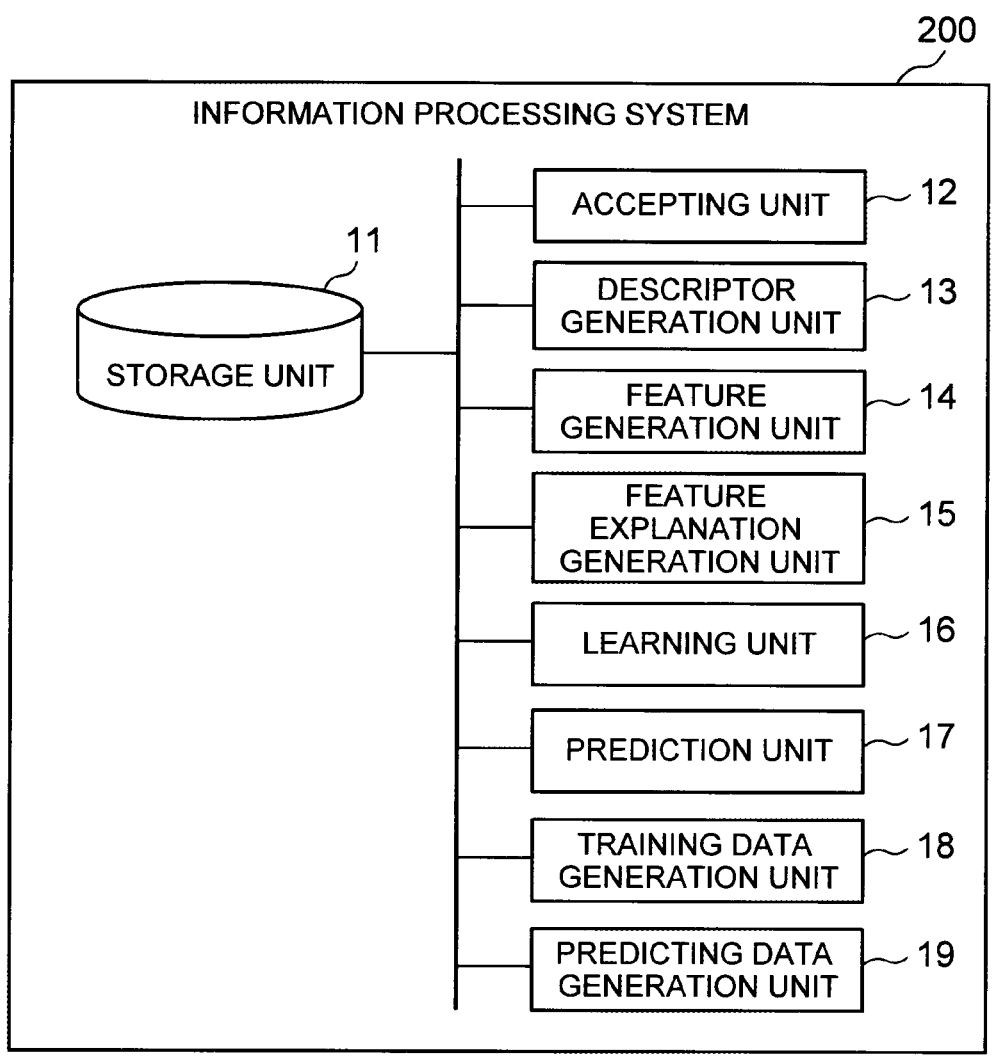
FIG. 18 is a block diagram showing an exemplary configuration of a third embodiment of an information processing system according to the present invention.

FIG. 18 is a block diagram showing an exemplary configuration of the third embodiment of the information processing system according to the present invention. The information processing system 200 in the present embodiment includes a storage unit 11, an accepting unit 12, a descriptor generation unit 13, a feature generation unit 14, a feature explanation generation unit 15, a learning unit 16, a prediction unit 17, a training data generation unit 18, and a predicting data generation unit 19.

That is to say, as compared to the information processing system 100 in the first embodiment, the information processing system 200 of the present embodiment additionally includes the learning unit 16, the prediction unit 17, the training data generation unit 18, and the predicting data generation unit 19. It should be noted that the storage unit 11, the accepting unit 12, the descriptor generation unit 13, the feature generation unit 14, and the feature explanation generation unit 15 have their contents identical to those in the first or second embodiment, so the detailed description thereof will not be repeated.

The training data generation unit 18 generates training data for use in learning by the learning unit 16, described later, on the basis of the feature generated by the feature generation unit 14 and the first table.

Further, the predicting data generation unit 19 generates predicting data for use by the prediction unit 17, described later, on the basis of the feature generated by the feature generation unit 14 and the first table.

The learning unit 16 uses the generated feature as a candidate for an explanatory variable, to learn a model for predicting a value of a prediction target. It should be noted that the way of learning a model is not particularly specified. The learning unit 16 may have a feature selection function. The learning unit 16 may perform the feature selection when it receives a plurality of candidates for the explanatory variable, and the learning unit 16 may perform learning processing by using the selected feature. The learning unit 16 may perform the learning processing as post-processing of the feature selection processing, or it may perform the feature selection processing and the learning processing in an integrated manner.

The prediction unit 17 uses the model learned by the learning unit 16 and the predicting data to perform prediction. Specifically, the prediction unit 17 applies the predicting data generated by the predicting data generation unit 19 to the model learned by the learning unit 16, to obtain a predicted result.

A description will now be given of how the learning unit 16 generates a model using the generated feature and how the prediction unit 17 obtains a predicted result, by using a specific example. FIG. 19 is a diagram illustrating exemplary target and source tables used in this specific example. It is assumed in this specific example that there are a target table T11 including data on February, 2010, and a target table T21 including data on March, 2010. The primary key of the target table T11 and the primary key of the target table T21 are both a customer ID. It is also assumed in this specific example that a target of prediction is the presence or absence of cancellation by the customer (customer ID=1021) included in the data on March, 2010.

The source table S16 illustrated in FIG. 19 represents customers' call logs. The source table S16 includes call logs for the customers included in the target table T11, for whom the presence or absence of cancellation is known, as well as call logs for the customer included in the target table T21.

For ease of understanding, it is assumed in this specific example that the accepting unit 12 has accepted the column indicating the primary key of the target table (in the example shown in T11 and T21, customer ID) as the joint information. The feature generation unit 14 applies the feature descriptor to the target table T11 and the source table S16 illustrated in FIG. 19, to generate a feature (a feature vector for the training data). Further, the feature generation unit 14 applies the same feature descriptor to the target table T21 and the source table S16 illustrated in FIG. 19, to generate a feature (a feature vector for the predicting data). In this specific example, it is assumed that "customer's maximum call duration" is generated as a first feature, "customer's total call duration" as a second feature, and "total count of SMS" as a third feature. As explained above, the feature generation unit 14 is supposed to output data in the form where the column designated by the joint information (here, customer ID) and the generated features are linked.

FIG. 20 is a diagram illustrating specific examples of training data and predicting data. The training data generation unit 18 uses the target table T11 and the features (feature vectors for the training data) generated by the feature generation unit 14, to generate training data R22. For example, the training data generation unit 18 generates the training data R22 by joining the target table T11 and the features (supposed to be linked to the customer ID as explained above) generated by the feature generation unit 14, by using the customer ID as the joint key. As shown in FIG. 20, the records included in the training data R22 each have a value for the objective variable. Further, the predicting data generation unit 19 uses the target table T21 and the features (feature vectors for the predicting data) generated by the feature generation unit 14, to generate predicting data R23. For example, the predicting data generation unit 19 generates the predicting data R23 by joining the target table T21 and the features (supposed to be linked to the customer ID as explained above) generated by the feature generation unit 14, by using the customer ID as the joint key. As shown in FIG. 20, the record included in the predicting data R23 does not have a value for the objective variable.

The learning unit 16 uses the generated training data R22 to learn a model. In the example shown in FIG. 20, the learning unit 16 learns the model by using "cancellation" as the objective variable and the other features (plan, device, generated features 1, 2, and 3) as candidates for the explanatory variable. For example, the model may be expressed by the following expression 1.

Cancellation Y=F(plan, feature 2, feature 3, . . . )  (Expression 1)

The prediction unit 17 assigns the values for the necessary features from within the predicting data R23 to the above expression 1, to obtain a predicted result. In the example explained above, "P2" as the value for the plan, "240" as the value for the feature 2, and "1" as the value for the feature 3 are assigned to the model, to thereby obtain the predicted result. In this manner, the presence or absence of cancellation by the customer identified by the customer ID=1021 is predicted.

The accepting unit 12, the descriptor generation unit 13, the feature generation unit 14, the feature explanation generation unit 15, the learning unit 16, the prediction unit 17, the training data generation unit 18, and the predicting data generation unit 19 are implemented by a CPU of a computer that operates in accordance with a program (feature description program).

Figure 21:
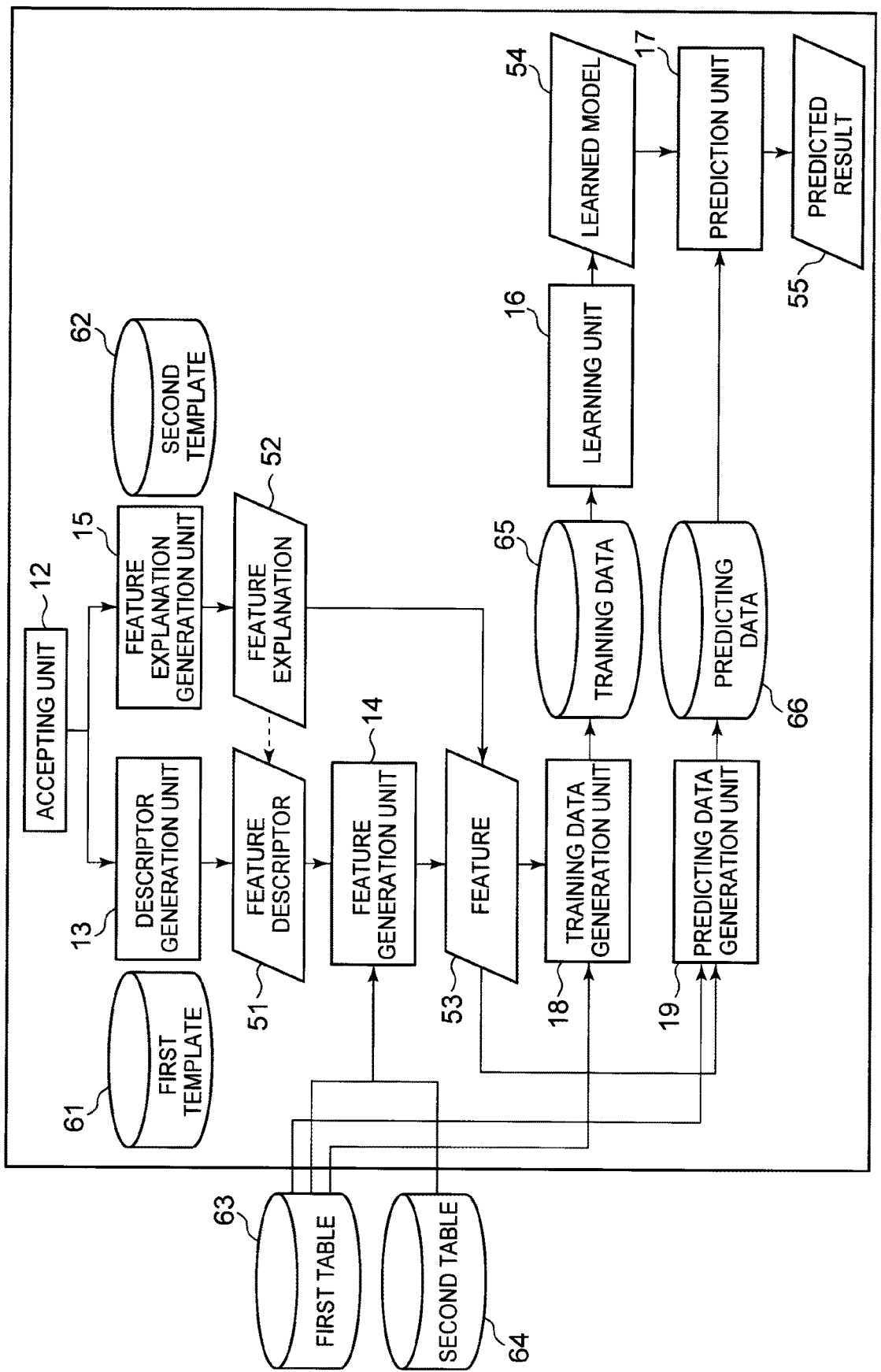
FIG. 21 is a diagram illustrating an exemplary operation of an information processing system 200.

FIG. 21 is a diagram illustrating an exemplary operation of the information processing system 200 of the present embodiment. It should be noted that a first template 61, a second template 62, a first table 63, a second table 64, training data 65, and predicting data 66 illustrated in FIG. 21 may be stored in the storage unit 11.

Firstly, the accepting unit 12 accepts various pieces of information necessary for generating a feature descriptor and a feature explanation. The descriptor generation unit 13 uses the accepted information and the first template 61 to generate a feature descriptor 51. The feature explanation generation unit 15 uses the accepted information and the second template 62 to generate a feature explanation 52.

The feature generation unit 14 applies the feature descriptor 51 to the first table 63 and the second table 64 to generate a feature 53. The feature generation unit 14 may add the feature explanation 52 to the generated feature 53.

The training data generation unit 18 generates training data 65 from the generated feature 53 and the data in the first table 63. The learning unit 16 uses the training data 65 to learn a learned model 54.

The predicting data generation unit 19 generates predicting data 66 from the generated feature 53 and the data in the first table 63. The prediction unit 17 uses the learned model 54 and the predicting data 66 to output a predicted result 55.

As described above, in the present embodiment, the learning unit 16 uses the generated feature as a candidate for an explanatory variable, to learn a model for predicting a value of the prediction target. Further, in the present embodiment, the prediction unit 17 applies the feature descriptor to the first and second tables to generate a feature to be assigned to the model, and applies the feature to the model to obtain a predicted value. This configuration makes it possible to make a prediction by learning a model using a newly generated feature, thereby enabling the prediction to be made with higher accuracy.

Embodiment 4

A fourth embodiment of the information processing system according to the present invention will now be described. In the first through third embodiments, the information processing system generated both a feature descriptor and a feature explanation. In the present embodiment, a method of generating a feature explanation from an already created feature descriptor will be described.

FIG. 22 is a block diagram showing an exemplary configuration of the fourth embodiment of the information processing system according to the present invention. The information processing system 300 of the present embodiment includes a storage unit 21, an accepting unit 22, an extraction unit 23, and a feature explanation generation unit 24.

The storage unit 21 stores a first table (target table) and a second table (source table) as in the first through third embodiments. Further, the first and second tables have their contents identical to those in the first through third embodiments.

The accepting unit 22 accepts a feature descriptor, explained in the first through third embodiments. That is, the accepting unit 22 accepts a feature descriptor which generates, from a first table including a variable of a prediction target and a second table, a feature which is a variable that may affect the prediction target.

As explained in the first embodiment, the feature descriptor is generated by applying various pieces of information to parameters in a first template prepared in advance. The first template includes: a joint parameter to which a value indicating key columns when joining first and second tables is assigned; and an aggregation parameter to which a value indicating an aggregation operation to be performed on a plurality of rows in the second table and a column as a target of the aggregation operation is assigned. The first template may also include a selection parameter to which a value indicating a condition for selecting any row fulfilling the condition from the second table and a column as a target of the selection is assigned. Furthermore, the first template may also include a table parameter to which a value identifying the second table is assigned.

The extraction unit 23 extracts, from the feature descriptor accepted by the accepting unit 22, table information indicating the name of the second table, joint information indicating the key columns when joining the first and second tables, and aggregation information indicating the aggregation operation to be performed on the rows in the second table and the column as a target of the aggregation operation. The extraction unit 23 may also extract selection information indicating the condition for selecting any row fulfilling that condition from the second table and the column as a target of the selection.

Specifically, the extraction unit 23 holds at least one template (hereinafter, referred to as a descriptor template) for use in comparison with a feature descriptor, and compares the accepted feature descriptor with the descriptor template to extract the table information, the joint information, and the aggregation information.

The descriptor template includes a table parameter, a joint parameter, and an aggregation parameter. The descriptor template is designed so as to be able to extract the respective parameters (i.e. the table parameter, the joint parameter, and the aggregation parameter) from the positional relationship with the comparison target (i.e. the feature descriptor). The descriptor template may be designed, for example, to be able to generate a feature descriptor when table information, joint information, and aggregation information are assigned to the corresponding parameters. The descriptor template may also include a selection parameter.

FIG. 23 is a diagram illustrating exemplary descriptor templates. Two descriptor templates are illustrated in FIG. 23. The template Temp41 illustrated in FIG. 23 is identical to the template Temp31 illustrated in FIG. 16. For example, the parameters can be extracted by using the template Temp41 illustrated in FIG. 23, through comparison with the feature descriptor. Further, assigning table information, joint information, aggregation information, and selection information to the respective parameters in the template Temp41 can generate a feature descriptor.

The extraction unit 23 extracts a value set in the position corresponding to the table parameter as the table information, extracts a value set in the position corresponding to the aggregation parameter as the aggregation information, and extracts a value set in the position corresponding to the joint parameter as the joint information. When the descriptor template also includes the selection parameter, the extraction unit 23 extracts a value set in the position corresponding to the selection parameter as the selection information.

FIG. 24 is a diagram illustrating exemplary processing of extracting various pieces of information from a feature descriptor. FIG. 24 shows an example where a feature descriptor D41 has been accepted and the descriptor template Temp41 is used to perform extraction processing.

For example, "call_log" has been set in the position in the feature descriptor D41 corresponding to the "source table name" as the table parameter in the descriptor template Temp41. Thus, the extraction unit 23 extracts "call_log" as the table information.

Similarly, "SUM" and "call duration" have been set in the positions corresponding respectively to "R. aggregate function" and "R. column name" as the aggregation parameter. Thus, the extraction unit 23 extracts "call duration, SUM" as the aggregation information.

Further, "customer ID" has been set in the position corresponding to "$M. T column name" as part of the joint parameter. Thus, the extraction unit 23 extracts "T. customer ID=Temp (call_log). customer ID" corresponding to "T. $M. T column name=Temp. $M. S column name" as the joint information.

Further, "call direction=IN" has been set in the position corresponding to "F. conditional expression" as the selection parameter. Thus, the extraction unit 23 extracts "call direction=IN" as the selection information.

In the case where there are two or more descriptor templates as illustrated in FIG. 23, the extraction unit 23 may select a descriptor template that is highest in similarity to the feature descriptor. For determination of the similarity, any method of calculating the similarity between statements may be used.

Further, the template Temp42 illustrated in FIG. 23 differs from the template used in the first through third embodiments. It is preferable to prepare a plurality of descriptor templates, in accordance with the format of the feature descriptor anticipated, in consideration of possible variation in syntax of the feature descriptor generated.

The feature explanation generation unit 24 assigns the extracted information to a template (second template) to generate a feature explanation of a feature that is obtained by applying the feature descriptor to the first and second tables. It should be noted that the way for the feature explanation generation unit 24 to generate a feature explanation is similar to the way for the feature explanation generation unit 15 in the first through third embodiments to generate a feature explanation.

The storage unit 21 is implemented by a magnetic disk device, for example. The accepting unit 22, the extraction unit 23, and the feature explanation generation unit 24 are implemented by a CPU of a computer that operates in accordance with a program (feature description program). For example, the program may be stored in the storage unit 21, and the CPU may read the program and operate as the accepting unit 22, the extraction unit 23, and the feature explanation generation unit 24 in accordance with the program. Further, the functions of the present information processing system may be provided in the form of Software as a Service (SaaS). Further, the accepting unit 22, the extraction unit 23, and the feature explanation generation unit 24 may each be implemented by dedicated hardware.

The accepting unit 22, the extraction unit 23, and the feature explanation generation unit 24 may each be implemented by general-purpose or dedicated circuitry. Here, the general-purpose or dedicated circuitry may be configured by a single chip, or by a plurality of chips connected via a bus. Further, in the case where some or all of the components of the devices are implemented by a plurality of information processing devices or circuits, such information processing devices or circuits may be arranged in a centralized or distributed manner. For example, the information processing devices or circuits may be implemented in the form of a client and server system, a cloud computing system, or the like where they are connected via a communication network.

A description will now be given of an operation of the information processing system of the present embodiment. FIG. 25 is a flowchart illustrating an exemplary operation of the information processing system of the fourth embodiment.

The accepting unit 22 accepts a feature descriptor (step S111). The extraction unit 23 extracts table information, joint information, and aggregation information from the feature descriptor (step S112). It should be noted that the accepting unit 22 may also extract selection information from the feature descriptor. The feature explanation generation unit 24 assigns the extracted information to a template (second template) to generate a feature explanation (step S113).

As described above, in the present embodiment, the accepting unit 22 accepts a feature descriptor, which generates a feature from first and second tables, and the extraction unit 23 extracts table information, joint information, and aggregation information from the feature descriptor. The feature explanation generation unit 24 then assigns the extracted information to a template (second template) to generate a feature explanation of a feature that is obtained by applying the feature descriptor to the first and second tables. It is thus possible to provide a description of the generated feature in a manner easily understandable by a human.

That is to say, as the feature descriptor described above is used for extracting a feature from the tables, one may often find it difficult to quickly understand the meaning of the generated feature even if he/she refers to the feature descriptor. However, in the present embodiment, the extraction unit 23 extracts various pieces of information necessary for understanding the meaning, and the feature explanation generation unit 24 formats the extracted information and provides the resultant information. This allows the generated feature to be described in a manner easily understandable by a human.

Figure 26:
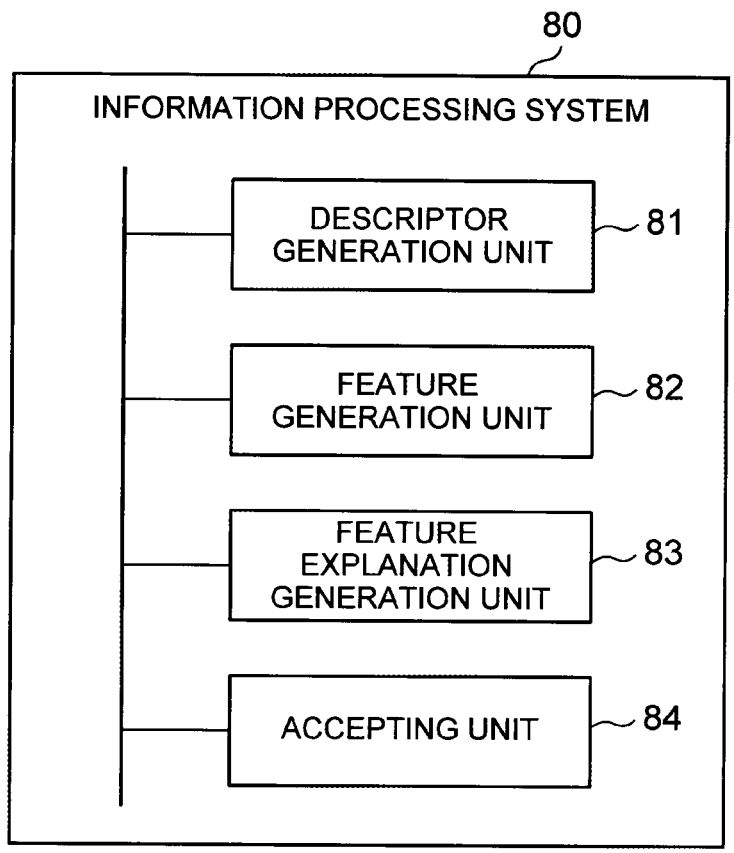
FIG. 26 is a block diagram showing an outline of an information processing system according to the present invention.

The present invention will now be outlined. FIG. 26 is a block diagram showing an overview of the information processing system according to the present invention. The information processing system 80 according to the present invention includes: a descriptor generation unit 81 (for example, the descriptor generation unit 13) which uses a first template prepared in advance to generate a feature descriptor, the feature descriptor generating a feature that may affect a prediction target from a first table (for example, a target table) including a variable of the prediction target and a second table (for example, a source table); a feature generation unit 82 (for example, the feature generation unit 14) which generates the feature by applying the feature descriptor to the first table and the second table; a feature explanation generation unit 83 (for example, the feature explanation generation unit 15) which generates a feature explanation about the feature descriptor or the feature on the basis of a second template; and an accepting unit 84 (for example, the accepting unit 12) which accepts values to be assigned to the first template and the second template.

The descriptor generation unit 81 assigns the accepted values to the first template to generate the feature descriptor, the feature explanation generation unit 83 assigns the values assigned to the first template to the second template to generate the feature explanation, and the feature generation unit 82 generates the feature which is used as a candidate for an explanatory variable when learning a model for predicting a value of the prediction target.

With this configuration, it is possible to provide a description of the generated feature in a manner easily understandable by a human.

Specifically, the first template and the second template may include a joint parameter to which a value indicating key columns when joining the first table and the second table is assigned, and an aggregation parameter to which a value indicating an aggregation operation to be performed on a plurality of rows in the second table and a column as a target of the aggregation operation is assigned. Then, the accepting unit 84 may accept joint information indicating a value to be assigned to the joint parameter and aggregation information indicating a value to be assigned to the aggregation parameter.

The first template and the second template may further include a selection parameter to which a value indicating a condition for selecting any row fulfilling the condition from the second table and a column as a target of the selection is assigned. Then, the accepting unit 84 may further accept selection information indicating a value to be assigned to the selection parameter.

The accepting unit 84 may accept one or more pieces of the joint information and one or more pieces of the aggregation information. The descriptor generation unit 81 may generate a plurality of combinations of the accepted pieces of joint information and aggregation information and generate the feature descriptors for the respective combinations. The feature explanation generation unit 83 may generate the feature explanations for the respective combinations. At this time, the information processing system 80 may further include a feature explanation appointing unit (for example, the feature explanation generation unit 15) which appoints a feature explanation to a feature descriptor that has been generated on the basis of the combination used for generating the feature explanation, or appoints a feature explanation to a feature that has been generated by applying the feature descriptor.

Alternatively, the first template and the second template may further include a selection parameter to which a value indicating a condition for selecting any row fulfilling the condition from the second table and a column as a target of the selection is assigned. Then, the accepting unit 84 may further accept one or more pieces of selection information indicating a value to be assigned to the selection parameter. The descriptor generation unit 81 may generate a plurality of combinations of the accepted pieces of joint information, aggregation information, and selection information, and generate the feature descriptors for the respective combinations. The feature explanation generation unit 83 may generate the feature explanations for the respective combinations.

The first template and the second template may further include a table parameter to which a value identifying the second table is assigned. Then, the accepting unit 84 may further accept table information which is a value to be assigned to the table parameter.

Specifically, the second template may include: a table template including a table parameter, a joint template including a joint parameter, an aggregation template including an aggregation parameter, a selection template including a selection parameter, and a label template including a plurality of label parameters to which labels are assigned. Then, the feature explanation generation unit 83 may assign table information to the table parameter to generate a table label, expressed in natural language, from the table template, assign joint information to the joint parameter to generate a joint label, expressed in natural language, from the joint template, assign aggregation information to the aggregation parameter to generate an aggregation label, expressed in natural language, from the aggregation template, assign selection information to the selection parameter to generate a selection label, expressed in natural language, from the selection template, and apply the table label, the joint label, the aggregation label, and the selection label to positions of the respective label parameters, to generate a feature explanation from the label template.

In the case where rows in the first table and rows in the second table have a one-to-many correspondence when joining the tables, the aggregation parameter may be assigned information indicating an aggregation operation to be performed on the plurality of rows in the second table and a column as a target of the aggregation operation.

The information processing system 80 may further include a learning unit (for example, the learning unit 16) which learns a model for predicting a value of the prediction target by using the generated feature as a candidate for an explanatory variable.

The information processing system 80 may further include a prediction unit (for example, the prediction unit 17) which applies the generated feature to the model to obtain a predicted value.

Figure 27:
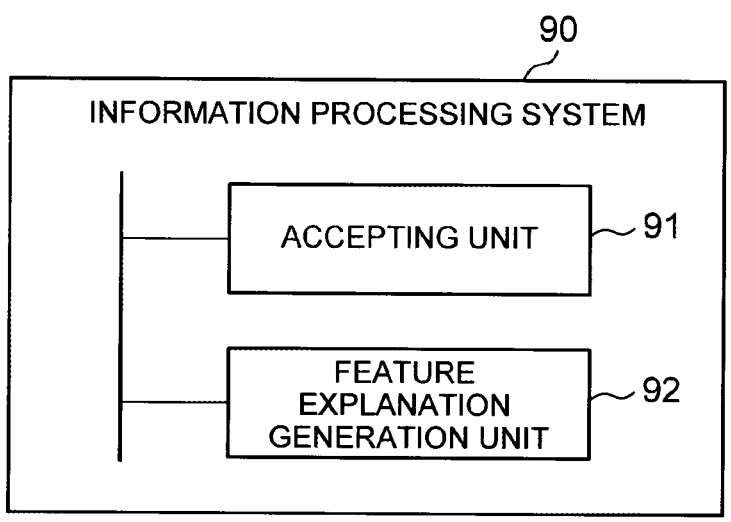
FIG. 27 is a block diagram showing another outline of the information processing system according to the present invention.

FIG. 27 is a block diagram showing another outline of the information processing system according to the present invention. The information processing system 90 according to the present invention includes: an accepting unit 91 (for example, the accepting unit 12) which accepts table information indicating a name of a second table (for example, a source table) to be associated with a first table (for example, a target table) including a variable of a prediction target, joint information indicating key columns when joining the first table and the second table, and aggregation information indicating an aggregation operation to be performed on a plurality of rows in the second table and a column as a target of the aggregation operation; and a feature explanation generation unit 92 (for example, the feature explanation generation unit 15) which generates a feature explanation by assigning values indicating respectively the table information, the joint information, and the aggregation information accepted by the accepting unit 91 to a template including a table parameter to which a value indicating the table information is to be assigned, a joint parameter to which a value indicating the joint information is to be assigned, and an aggregation parameter to which a value indicating the aggregation information is to be assigned.

With this configuration as well, it is possible to provide a description of the generated feature in a manner easily understandable by a human.

Figure 28:
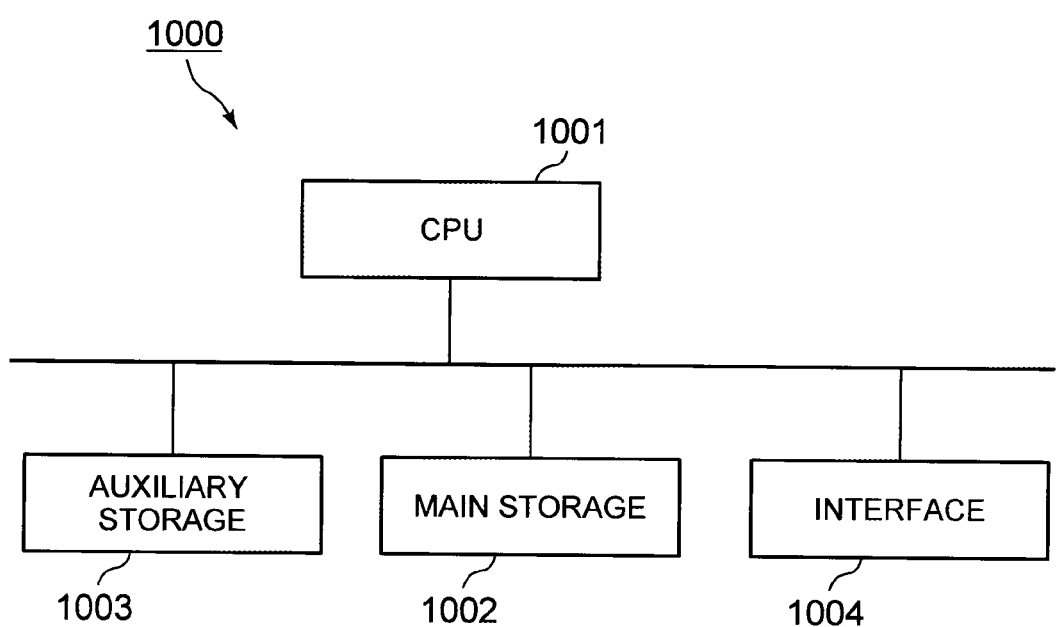
FIG. 28 is a schematic block diagram showing a configuration of a computer according to at least one embodiment.

FIG. 28 is a schematic block diagram showing a configuration of a computer according to at least one embodiment. The computer 1000 includes a CPU 1001, a main storage 1002, an auxiliary storage 1003, and an interface 1004.

The information processing system described above is implemented in the computer 1000. The operations of the above-described processing units are stored in the auxiliary storage 1003 in the form of a program (feature description program). The CPU 1001 reads the program from the auxiliary storage 1003 and deploys the program in the main storage 1002, to execute the above-described processing in accordance with the program.

In at least one embodiment, the auxiliary storage 1003 is an example of non-transitory tangible media. Other examples of the non-transitory tangible media include a magnetic disk, a magneto-optical disk, a CD-ROM, a DVD-ROM, and a semiconductor memory connected via the interface 1004. When the program is distributed to the computer 1000 via a communication line, the computer 1000 that has received the distributed program may deploy the program in the main storage 1002 and execute the above-described processing.

The program may be one for achieving part of the above-described functions. Further, the program may be a so-called differential file (differential program) which achieves the above-described functions in combination with another program already stored in the auxiliary storage 1003.

Some or all of the above exemplary embodiments can also be described as the following supplementary notes but are not limited thereto.

(Supplementary note 1) An information processing system comprising: a descriptor generation unit which generates a feature descriptor by using a first template prepared in advance, the feature descriptor generating a feature that may affect a prediction target from a first table including a variable of the prediction target and a second table; a feature generation unit which generates the feature by applying the feature descriptor to the first table and the second table; a feature explanation generation unit which generates a feature explanation about the feature descriptor or the feature on the basis of a second template; and an accepting unit which accepts values to be assigned to the first template and the second template; wherein the descriptor generation unit generates the feature descriptor by assigning the accepted values to the first template, the feature explanation generation unit generates the feature explanation by assigning the values assigned to the first template to the second template, and the feature generation unit generates the feature for use as a candidate for an explanatory variable when learning a model for predicting a value of the prediction target.

(Supplementary note 2) The information processing system according to supplementary note 1, wherein the first template and the second template each include a joint parameter to which a value indicating key columns when joining the first table and the second table is assigned, and an aggregation parameter to which a value indicating an aggregation operation to be performed on a plurality of rows in the second table and a column as a target of the aggregation operation is assigned, and the accepting unit accepts joint information indicating a value to be assigned to the joint parameter and aggregation information indicating a value to be assigned to the aggregation parameter.

(Supplementary note 3) The information processing system according to supplementary note 2, wherein the first template and the second template each further include a selection parameter to which a value indicating a condition for selecting any row fulfilling the condition from the second table and a column as a target of the selection is assigned, and the accepting unit further accepts selection information indicating a value to be assigned to the selection parameter.

(Supplementary note 4) The information processing system according to supplementary note 2, wherein the accepting unit accepts one or more pieces of the joint information and one or more pieces of the aggregation information, the descriptor generation unit generates a plurality of combinations of the accepted pieces of the joint information and the aggregation information, and generates the feature descriptors for the respective combinations, and the feature explanation generation unit generates the feature explanations for the respective combinations, the system further comprising: a feature explanation appointing unit which appoints the feature explanation to the feature descriptor that has been generated on the basis of the combination used when generating the feature explanation, or appoint the feature explanation to the feature that has been generated by applying the feature descriptor.

(Supplementary note 5) The information processing system according to supplementary note 4, wherein the first template and the second template each further include a selection parameter to which a value indicating a condition for selecting any row fulfilling the condition from the second table and a column as a target of the selection is assigned, the accepting unit further accepts one or more pieces of selection information indicating a value to be assigned to the selection parameter, the descriptor generation unit generates a plurality of combinations of the accepted pieces of the joint information, the aggregation information, and the selection information, and generates the feature descriptors for the respective combinations, and the feature explanation generation unit generates the feature explanations for the respective combinations.

(Supplementary note 6) The information processing system according to any one of supplementary notes 2 to 5, wherein the first template and the second template each further include a table parameter to which a value identifying the second table is assigned, and the accepting unit further accepts table information indicating a value to be assigned to the table parameter.

(Supplementary note 7) The information processing system according to supplementary note 6, wherein the second template includes a table template including a table parameter, a joint template including a joint parameter, an aggregation template including an aggregation parameter, a selection template including a selection parameter, and a label template including a plurality of label parameters to which labels are assigned, and the feature explanation generation unit generates a table label, expressed in natural language, from the table template by assigning table information to the table parameter, generates a joint label, expressed in natural language, from the joint template by assigning joint information to the joint parameter, generates an aggregation label, expressed in natural language, from the aggregation template by assigning aggregation information to the aggregation parameter, generates a selection label, expressed in natural language, from the selection template by assigning selection information to the selection parameter, and generates the feature explanation from the label template by applying the table label, the joint label, the aggregation label, and the selection label to positions of the respective label parameters.

(Supplementary note 8) The information processing system according to any one of supplementary notes 2 to 7, wherein in a case where rows in the first table and rows in the second table have a one-to-many correspondence when joining the tables, the aggregation parameter is assigned information indicating the aggregation operation to be performed on the plurality of rows in the second table and the column as a target of the aggregation operation.

(Supplementary note 9) The information processing system according to any one of supplementary notes 1 to 8, further comprising: a learning unit which learns a model for predicting a value of the prediction target, by using the generated feature as a candidate for an explanatory variable.

(Supplementary note 10) The information processing system according to supplementary note 9, further comprising: a prediction unit which obtains a predicted value by applying the generated feature to the model.

(Supplementary note 11) An information processing system comprising: an accepting unit which accepts table information indicating a name of a second table to be associated with a first table including a variable of a prediction target, joint information indicating key columns when joining the first table and the second table, and aggregation information indicating an aggregation operation to be performed on a plurality of rows in the second table and a column as a target of the aggregation operation; and a feature explanation generation unit which generates a feature explanation by assigning values indicating respectively the table information, the joint information, and the aggregation information accepted by the accepting unit to a template including a table parameter to which a value indicating the table information is to be assigned, a joint parameter to which a value indicating the joint information is to be assigned, and an aggregation parameter to which a value indicating the aggregation information is to be assigned.

(Supplementary note 12) The information processing system according to supplementary note 11, wherein the accepting unit which further accepts selection information indicating a condition for selecting any row fulfilling the condition from the second table and a column as a target of the selection, the template further includes a selection parameter to which a value indicating the selection information is to be assigned, and the feature explanation generation unit generates the feature explanation by assigning a value indicating the selection information accepted by the accepting unit to the template.

(Supplementary note 13) A feature explanation generation method comprising: generating a feature descriptor by assigning accepted values to a first template prepared in advance, the feature descriptor generating a feature that may affect a prediction target from a first table including a variable of the prediction target and a second table; generating the feature by applying the feature descriptor to the first table and the second table, the feature being used as a candidate for an explanatory variable when learning a model for predicting a value of the prediction target; and generating a feature explanation about the feature descriptor or the feature by assigning the values assigned to the first template to a second template.

(Supplementary note 14) A feature explanation generation method comprising: accepting table information indicating a name of a second table to be associated with a first table including a variable of a prediction target, joint information indicating key columns when joining the first table and the second table, and aggregation information indicating an aggregation operation to be performed on a plurality of rows in the second table and a column as a target of the aggregation operation; and generating a feature explanation by assigning a value indicating the accepted table information, a value indicating the accepted joint information, and a value indicating the accepted aggregation information to a template including a table parameter to which a value indicating the table information is to be assigned, a joint parameter to which a value indicating the joint information is to be assigned, and an aggregation parameter to which a value indicating the aggregation information is to be assigned.

(Supplementary note 15) A feature explanation generation program causing a computer to perform: descriptor generation processing of generating a feature descriptor by using a first template prepared in advance, the feature descriptor generating a feature that may affect a prediction target from a first table including a variable of the prediction target and a second table; feature generation processing of generating the feature by applying the feature descriptor to the first table and the second table; feature explanation generation processing of generating a feature explanation about the feature descriptor or the feature on the basis of a second template; and accepting processing of accepting values to be assigned to the first template and the second template; wherein the program causes the computer to generate, in the descriptor generation processing, the feature descriptor by assigning the accepted values to the first template, generate, in the feature explanation generation processing, the feature explanation by assigning the values assigned to the first template to the second template, and generate, in the feature generation processing, the feature for use as a candidate for an explanatory variable when learning a model for predicting a value of the prediction target.

(Supplementary note 16) A feature explanation generation program causing a computer to perform: accepting processing of accepting table information indicating a name of a second table to be associated with a first table including a variable of a prediction target, joint information indicating key columns when joining the first table and the second table, and aggregation information indicating an aggregation operation to be performed on a plurality of rows in the second table and a column as a target of the aggregation operation; and feature explanation generation processing of generating a feature explanation by assigning values indicating respectively the table information, the joint information, and the aggregation information accepted in the accepting processing to a template including a table parameter to which a value indicating the table information is to be assigned, a joint parameter to which a value indicating the joint information is to be assigned, and an aggregation parameter to which a value indicating the aggregation information is to be assigned.

REFERENCE SIGNS LIST 11, 21 storage unit
12, 22 accepting unit
13 descriptor generation unit
14 feature generation unit
15, 24 feature explanation generation unit
16 learning unit
17 prediction unit
18 training data generation unit
19 predicting data generation unit
23 extraction unit
100, 200 information processing system
S11, S13, S14, S15 source table
T11, T21 target table
D11, D21, D22, D31, D32, D33, D34 feature descriptor
E11, E12, E13 feature explanation

What is claimed is:

1. An information processing system comprising: a hardware including a processor; a descriptor generation unit, implemented by the processor, which generates a feature descriptor by using a first template prepared in advance, the feature descriptor generating a feature that affects a prediction target from a first table including a variable of the prediction target and a second table; a feature generation unit, implemented by the processor, which generates the feature by applying the feature descriptor to the first table and the second table; a feature explanation generation unit, implemented by the processor, which generates a feature explanation about the feature descriptor or the feature on the basis of a second template; and an accepting unit, implemented by the processor, which accepts values to be assigned to the first template and the second template; wherein the descriptor generation unit generates the feature descriptor by assigning the accepted values to the first template, the feature explanation generation unit generates the feature explanation by assigning the values assigned to the first template to the second template, and the feature generation unit generates the feature for use as a candidate for an explanatory variable when learning a model for predicting a value of the prediction target.

2. The information processing system according to claim 1, wherein
the first template and the second template each include
a joint parameter to which a value indicating key columns when joining the first table and the second table is assigned, and
an aggregation parameter to which a value indicating an aggregation operation to be performed on a plurality of rows in the second table and a column as a target of the aggregation operation is assigned, and
the accepting unit accepts joint information indicating a value to be assigned to the joint parameter and aggregation information indicating a value to be assigned to the aggregation parameter.

3. The information processing system according to claim 2, wherein
the first template and the second template each further include a selection parameter to which a value indicating a condition for selecting any row fulfilling the condition from the second table and a column as a target of the selection is assigned, and
the accepting unit further accepts selection information indicating a value to be assigned to the selection parameter.

4. The information processing system according to claim 2, wherein
the accepting unit accepts one or more pieces of the joint information and one or more pieces of the aggregation information,
the descriptor generation unit generates a plurality of combinations of the accepted pieces of the joint information and the aggregation information, and generates the feature descriptors for the respective combinations, and
the feature explanation generation unit generates the feature explanations for the respective combinations,
the system further comprising:
a feature explanation appointing unit, implemented by the processor, which appoints the feature explanation to the feature descriptor that has been generated on the basis of the combination used when generating the feature explanation, or appoints the feature explanation to the feature that has been generated by applying the feature descriptor.

5. The information processing system according to claim 4, wherein
the first template and the second template each further include a selection parameter to which a value indicating a condition for selecting any row fulfilling the condition from the second table and a column as a target of the selection is assigned,
the accepting unit further accepts one or more pieces of selection information indicating a value to be assigned to the selection parameter,
the descriptor generation unit generates a plurality of combinations of the accepted pieces of the joint information, the aggregation information, and the selection information, and generates the feature descriptors for the respective combinations, and
the feature explanation generation unit generates the feature explanations for the respective combinations.

6. The information processing system according to claim 2, wherein
the first template and the second template each further include a table parameter to which a value identifying the second table is assigned, and
the accepting unit further accepts table information indicating a value to be assigned to the table parameter.

7. The information processing system according to claim 6, wherein
the second template includes
a table template including a table parameter,
a joint template including a joint parameter,
an aggregation template including an aggregation parameter,
a selection template including a selection parameter, and
a label template including a plurality of label parameters to which labels are assigned, and
the feature explanation generation unit
generates a table label, expressed in natural language, from the table template by assigning table information to the table parameter,
generates a joint label, expressed in natural language, from the joint template by assigning joint information to the joint parameter,
generates an aggregation label, expressed in natural language, from the aggregation template by assigning aggregation information to the aggregation parameter,
generates a selection label, expressed in natural language, from the selection template by assigning selection information to the selection parameter, and
generates the feature explanation from the label template by applying the table label, the joint label, the aggregation label, and the selection label to positions of the respective label parameters.

8. The information processing system according to claim 2, wherein in a case where rows in the first table and rows in the second table have a one-to-many correspondence when joining the tables, the aggregation parameter is assigned information indicating the aggregation operation to be performed on the plurality of rows in the second table and the column as a target of the aggregation operation.

9. The information processing system according claim 1, further comprising:
a learning unit, implemented by the processor, which learns a model for predicting a value of the prediction target, by using the generated feature as a candidate for an explanatory variable.

10. The information processing system according to claim 9, further comprising:
a prediction unit, implemented by the processor, which obtains a predicted value by applying the generated feature to the model.

11. A feature explanation generation method comprising:
generating a feature descriptor by assigning accepted values to a first template prepared in advance, the feature descriptor generating a feature that affects a prediction target from a first table including a variable of the prediction target and a second table;
generating the feature by applying the feature descriptor to the first table and the second table, the feature being used as a candidate for an explanatory variable when learning a model for predicting a value of the prediction target; and
generating a feature explanation about the feature descriptor or the feature by assigning the values assigned to the first template to a second template.

* * * * *